(12) United States Patent
Mandavilli et al.

(10) Patent No.: US 10,743,063 B2
(45) Date of Patent: *Aug. 11, 2020

(54) INTELLIGENT ROUTING OF NOTIFICATIONS RELATED TO MEDIA PROGRAMMING

(71) Applicant: QUALCOMM Incorporated, San Diego, CA (US)

(72) Inventors: Ravi Teja Mandavilli, Bangalore (IN); Prathviraj Shetty, Bangalore (IN); Sravan Kumar Reddy Achamola, BN Reddy Nagar Hyderabad (IN); Kiran Koona, Miyapur (IN); Vitesh Kempanna Nataraj, Bangalore (IN); Pavan Kumar Patted, Bellary (IN); Tejasree Depa, Hyderabad (IN); Sidhartha Kumar Kar, Hyderabad (IN); Chaitanya Panuganti, Hyderabad (IN); Manoj Kannan Venugopal, Coimbatore (IN); Naman Pandey, Hyderabad (IN); Anshul Gupta, Hyderabad (IN); Venkata Ramana Reddy Yaddula, Hyderabad (IN); Lakshmana Rao Venigalla, Hyderabad (IN); Venkata SubbaRao Annam, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,005

(22) Filed: Nov. 14, 2018

(65) Prior Publication Data

US 2019/0191214 A1 Jun. 20, 2019

(51) Int. Cl.
*H04N 21/442* (2011.01)
*H04N 21/422* (2011.01)
(Continued)

(52) U.S. Cl.
CPC ... *H04N 21/44218* (2013.01); *G06K 9/00288* (2013.01); *G10L 17/005* (2013.01);
(Continued)

(58) Field of Classification Search
None
See application file for complete search history.

(56) References Cited

U.S. PATENT DOCUMENTS

| 9,319,856 B1 * | 4/2016 | Riggs | H04L 43/106 |
| 10,187,870 B1 * | 1/2019 | Achamola | H04M 3/46 |
| 2011/0202956 A1 * | 8/2011 | Connelly | H04N 21/433 725/38 |

* cited by examiner

*Primary Examiner* — Omar S Parra
(74) *Attorney, Agent, or Firm* — Qualcomm Incorporated

(57) ABSTRACT

This disclosure provides systems, methods and apparatus, including computer programs encoded on computer storage media for intelligent routing of notifications related to media programming. In one aspect, a smart television (TV) can be implemented to track a user's TV watching behavior, and anticipate programming based on that behavior. In some other aspects, the smart TV can be implemented to detect a user's presence, and based on that detection, can automatically change the TV channel to media programming analyzed to be desirable to the user. In some further aspects, the smart TV can be implemented to transmit notification instructions to electronic devices within a network in an attempt to alert the user to upcoming media programming. Additionally, the smart TV can be implemented to transmit detection instructions to the electronic devices within the network, whereby the electronic devices attempt to detect a user's presence through voice or facial recognition.

30 Claims, 13 Drawing Sheets

(51) Int. Cl.
  *G10L 17/00* (2013.01)
  *H04N 21/454* (2011.01)
  *H04N 21/482* (2011.01)
  *H04N 21/466* (2011.01)
  *G06K 9/00* (2006.01)
  *H04N 21/4223* (2011.01)
  *H04N 21/488* (2011.01)

(52) U.S. Cl.
  CPC ... *H04N 21/4223* (2013.01); *H04N 21/42203* (2013.01); *H04N 21/44222* (2013.01); *H04N 21/454* (2013.01); *H04N 21/4666* (2013.01); *H04N 21/4826* (2013.01); *H04N 21/4882* (2013.01); *G10L 17/00* (2013.01)

700

| TIME | DAY | | Channel 1 | Channel 2 | Channel 3 | Channel 4 |
|---|---|---|---|---|---|---|
| 7 | 1 | | 0 | 1 | 1 | 0 |
| 7 | 1 | | 0 | 1 | 0 | 1 |
| 7 | 1 | | 1 | 1 | 0 | 0 |
| 7 | 1 | | 0 | 1 | 0 | 1 |
| 7 | 1 | | 0 | 1 | 0 | 0 |
| 7 | 1 | | 0 | 1 | 1 | 0 |
| 7 | 1 | | 0 | 1 | 1 | 0 |
| 7 | 1 | | 1 | 1 | 1 | 0 |
| 7 | 1 | | 0 | 1 | 0 | 1 |
| 7 | 1 | | 0 | 1 | 1 | 0 |
| 7 | 1 | | 1 | 1 | 1 | 0 |
| 7 | 1 | | 0 | 1 | 1 | 0 |
| 7 | 1 | | 1 | 1 | 0 | 0 |
| 8 | 1 | | 1 | 0 | 0 | 1 |
| 8 | 1 | | 1 | 0 | 0 | 1 |
| 8 | 1 | | 1 | 1 | 0 | 1 |
| 8 | 1 | | 1 | 0 | 1 | 0 |
| 8 | 1 | | 1 | 0 | 1 | 0 |
| 8 | 1 | | 1 | 1 | 0 | 0 |
| 8 | 1 | | 1 | 0 | 1 | 1 |
| 8 | 1 | | 1 | 1 | 0 | 0 |
| 8 | 1 | | 1 | 0 | 1 | 1 |
| 8 | 1 | | 1 | 0 | 1 | 0 |
| 8 | 1 | | 1 | 0 | 1 | 0 |
| 8 | 1 | | 1 | 1 | 0 | 0 |
| 8 | 1 | | 1 | 0 | 0 | 1 |

*FIGURE 7*

INTELLIGENT ROUTING OF
NOTIFICATIONS RELATED TO MEDIA
PROGRAMMING

CROSS-REFERENCE TO RELATED APPLICATIONS

This Patent Application claims priority to India Provisional Patent Application No. 2017/41041435, filed Nov. 20, 2017 entitled "Intelligent Routing of Notifications Related to Media Programming," and India Provisional Application No. 2018/41024599, filed Jul. 2, 2018, entitled "Intelligence in Smart Televisions (TVs)," and assigned to the assignee hereof. The disclosures of the prior Applications are considered part of and are incorporated by reference in this Patent Application.

TECHNICAL FIELD

This disclosure relates generally communications between electronic devices, and more particularly to routing notifications related to media programming to one or more electronic devices and delivering customized content and display setting preferences to users viewing an electronic device.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after.

Advances in electronic technology have also resulted in smaller, powerful, and "smarter" wireless communication devices. For example, the market for and adoption of smart televisions (TVs) is expected to see substantial growth. While smart TVs continue to increase in popularity, it would be desirable to further integrate smart TV functionality with existing wireless communication devices, and to utilize smart TV functionality to deliver customized content.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of routing instructions for notifications related to media programming. The method can include receiving an indication of media programming, identifying one or more devices having at least one of a microphone or a camera, instructing at least one identified device to detect audio signals using its respective microphone, or to detect visual signals using its respective camera, selecting at least one device of the one or more devices based on the detected audio signal or detected visual signal, and providing instructions to the selected device to output a notification related to the media programming. In some implementations, an electronic device receives the indication of media programming.

In some implementations, the electronic device is a smart television (TV). In some implementations, the one or more devices includes at least one of a mobile device, a smartphone, a laptop computer, a tablet device, a wearable device, an Internet of Things (IoT) device, an Internet of Everything (IoE) device, an IoT hub, an IoE hub, or another smart TV. In some implementations, the smart TV is capable of turning on the media programming. In some implementations, the smart TV turns on the media programming based on the received indication.

In some implementations, the media programming is one of a live television program, a recorded television program, a broadcast television program, or an application-provided program. The media programming can be an upcoming program, intended to be presented on the electronic device. In some implementations, the media programming is identified based on analysis of a user profile.

In some implementations, selecting the first device based on the detected audio signal includes recognizing a voice. In some implementations, recognizing the voice includes a voice recognition technique. The method can further include determining a distance to the recognized voice. In some implementations, selecting the first device is based on the determined distance to the recognized voice.

In some implementations, selecting the first device based on the detected visual signals includes recognizing a face. In some implementations, recognizing the face includes a face recognition technique. In some implementations, the notification includes at least one of a push message, a SMS message, a Way2SMS message, an audio alert, an audio message, or an email message.

Another innovative aspect of the subject matter described in this disclosure can be implemented in an electronic device capable of communicating with one or more devices. The electronic device can include a network interface, a non-transitory computer-readable medium, and a processor in communication with the network interface, and the non-transitory computer-readable medium, and capable of executing processor-executable program code stored in the non-transitory computer-readable medium, to cause the electronic device to operate in a particular manner. The electronic device can receive an indication of upcoming media programming, identify one or more devices in communication with the electronic device, each of the one or more devices including at least one of a microphone or a camera, instruct at least one identified device to detect audio signals using its respective microphone, or to detect visual signals using its respective camera, select at least one device of the one or more devices based on the detected audio signal or detected visual signal, and provide instructions to the selected device to output a notification related to the upcoming media programming. Additionally, the electronic device can be implemented to perform any of the aspects of the innovative method described above.

Another innovative aspect of the subject matter described in this disclosure can be implemented in an electronic device capable of communicating with one or more devices. The electronic device can include means for receiving an indication of upcoming media programming, means for identifying one or more devices in communication with the electronic device, each of the one or more devices including at least one of a microphone or a camera, means for instructing at least one identified device to detect audio signals using its respective microphone, or to detect visual signals using its respective camera, means for selecting at least one device of the one or more devices based on the detected audio signal or detected visual signal, and means for providing instructions to the selected device to output a notification related to the upcoming media programming. Additionally, the electronic device can be implemented to perform any of the aspects of the innovative method described above.

Another innovative aspect of the subject matter described in this disclosure can be implemented in a non-transitory computer-readable medium including processor-executable program code capable of causing a processor of an electronic device to route instructions for notifications related to media programming. The non-transitory computer-readable medium can include processor-executable program code capable of causing the processor to receive an indication of upcoming media programming, identify one or more devices in communication with the electronic device, each of the one or more devices including at least one of a microphone or a camera, instruct at least one identified device to detect audio signals using its respective microphone, or to detect visual signals using its respective camera, select at least one device of the one or more devices based on the detected audio signal or detected visual signal, and provide instructions to the selected device to output a notification related to the upcoming media programming. Additionally, the electronic device can be implemented to perform any of the aspects of the innovative method described above.

Another innovative aspect of the subject matter described in this disclosure can be implemented in a method for presenting media programming on a smart television (TV). The method can include obtaining TV channel viewing data, wherein the TV channel viewing data includes at least one of a historical time and a historical date that one or more channels were viewed on the smart TV, obtaining at least one of a current time and a current date, processing the TV channel viewing data to determine a probability of the one or more channels being viewed on the smart TV based on at least one of the current time and the current date, and presenting a favorite channel list on the smart TV based on the determined probability of the one or more channels being viewed. In some implementations, one or more channels are presented on the favorite channel list in order of the determined probability.

In some implementations, processing the TV channel viewing data includes employing a neural network model. In some implementations, employing the neural network model includes determining a duration that the one or more channels were viewed on the smart TV for each of the at least one of the historical time and the historical date, setting a threshold time duration, comparing the determined duration to the threshold time duration, and filtering out the one or more channels viewed below the threshold time duration.

In some implementations, the method includes adjusting at least one of a volume or a brightness of the smart TV, where the adjusting is based on at least one of the historical time and the historical date. In some implementations, the method includes detecting a presence of a user, and accessing user profile data associated with the user, where the user profile includes the TV channel viewing data. In some implementations, detecting the presence of the user includes employing one or more of a camera, a microphone, or a fingerprint sensor associated with at least one of the smart TV, a mobile device, a smartphone, a laptop computer, a tablet device, a wearable device, an Internet of Things (IoT) device, an Internet of Everything (IoE) device, an IoT hub, or an IoE hub. In some implementations, adjusting at least one of a volume or a brightness of the smart TV, is based on the user profile data. In some implementations, the method includes restricting access to one or more channels based on the user profile data.

Another innovative aspect of the subject matter described in this disclosure can be implemented in an electronic device capable of presenting media programming. The electronic device includes a network interface, a non-transitory computer-readable medium, and a processor in communication with the network interface, and the non-transitory computer-readable medium, and capable of executing processor-executable program code stored in the non-transitory computer-readable medium, to cause the electronic device to operate in a particular manner. The electronic device can obtain television (TV) channel viewing data, wherein the TV channel viewing data includes at least one of a historical time and a historical date that one or more channels were viewed on a smart TV, obtain at least one of a current time and a current date, process the TV channel viewing data to determine a probability of the one or more channels being viewed on the smart TV based on at least one of the current time and the current date and present a favorite channel list on the smart TV based on the determined probability of the one or more channels being viewed. Additionally, the electronic device can be implemented to perform any of the aspects of the innovative method described above.

Another innovative aspect of the subject matter described in this disclosure can be implemented in an electronic device capable of presenting media programming. The electronic device can include means for obtaining television (TV) channel viewing data, wherein the TV channel viewing data includes at least one of a historical time and a historical date that one or more channels were viewed on a smart TV, means for obtaining at least one of a current time and a current date, means for processing the TV channel viewing data to determine a probability of the one or more channels being viewed on the smart TV based on at least one of the current time and the current date, and means for presenting a favorite channel list on the smart TV based on the determined probability of the one or more channels being viewed. Additionally, the electronic device can be implemented to perform any of the aspects of the innovative method described above.

Another innovative aspect of the subject matter described in this disclosure can be implemented in a non-transitory computer-readable medium including processor-executable program code configured to cause a processor of an electronic device to obtain television (TV) channel viewing data, wherein the TV channel viewing data includes at least one of a historical time and a historical date that one or more channels were viewed on a smart TV, obtain at least one of a current time and a current date, process the TV channel viewing data to determine a probability of the one or more channels being viewed on the smart TV based on at least one of the current time and the current date, and present a favorite channel list on the smart TV based on the determined probability of the one or more channels being viewed. Additionally, the processor of the electronic device can be implemented to perform any of the aspects of the innovative method described above.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows an example training data table used for a neural network model.

Like reference numbers and designations in the various drawings indicate like elements.

DETAILED DESCRIPTION

Figure 1:
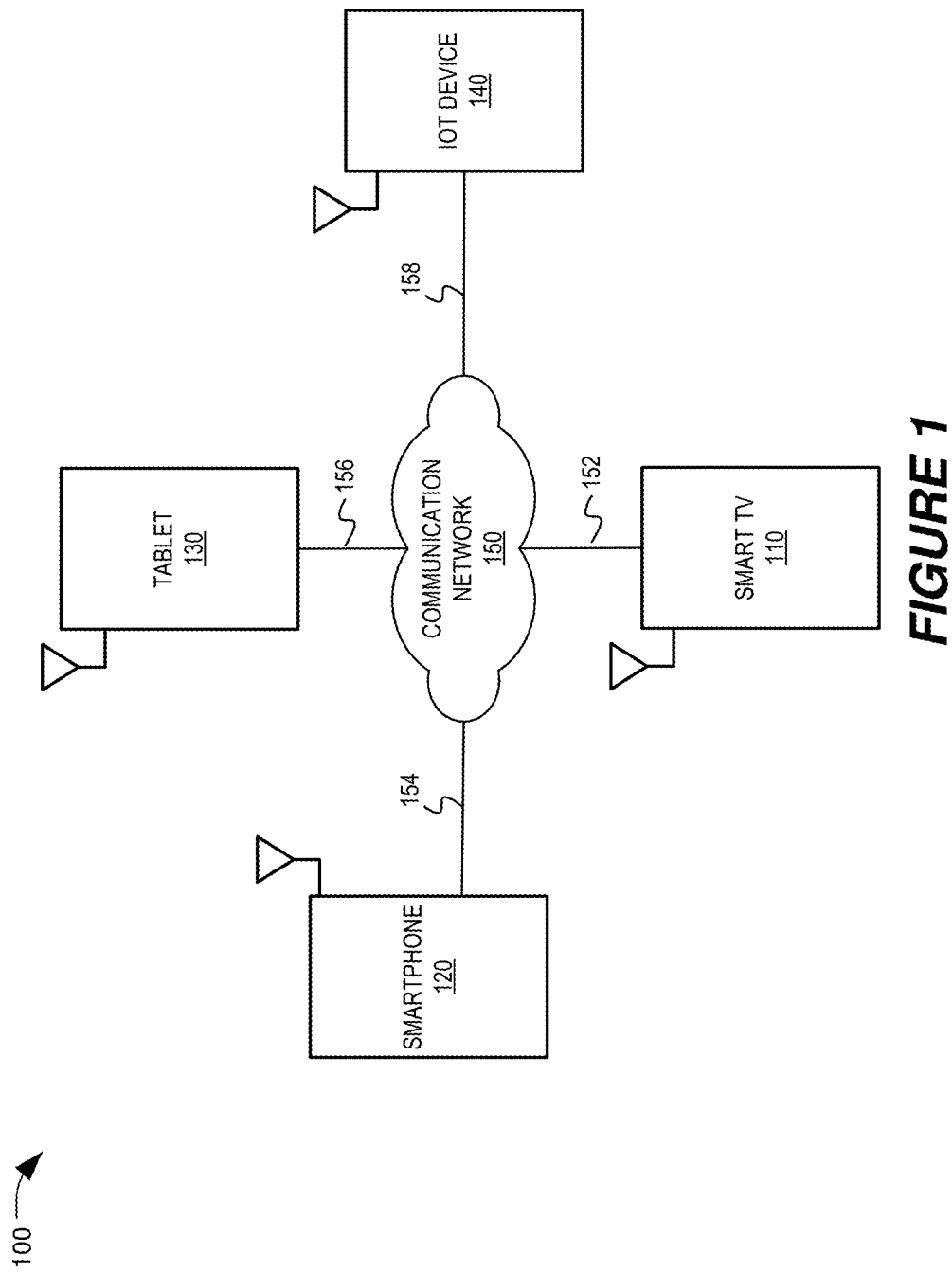
FIG. 1 shows an example wireless communication system including a smart TV, a first mobile device, a second mobile device and an IoT device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving optical signals or RF signals according to any wireless communication standard, including any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein relate to methods, systems, devices, or apparatuses supporting communication between a first device, such as a smart television (TV), and a second device, with such non-limiting examples including a mobile device, an Internet of Things (IoT) device, an Internet of Everything (IoE) device, or a wearable device. Smart TVs continue to gain traction in the consumer marketplace, as they generally include the traditional functionality of television sets and set-top boxes provided through broadcasting media, in addition to providing Internet-based TV, online interactive media, over-the-top (OTT) content, on-demand media streaming, and home networking access. Smart TVs often employ software applications, or "apps," which can be preloaded into the device, or installed from an app store or app marketplace. Some smart TVs include microphones or cameras, which can be built-in the device, or otherwise associated with the device. Additionally, smart TVs can be implemented to receive login credentials from a user, and can be implemented to tailor content for a particular user based on that user's profile. Furthermore, smart TVs can be implemented to communicate with other devices over a communication network.

According to the disclosed techniques, a smart TV can be implemented to track a user's TV watching behavior, and anticipate programming based on that behavior. In some implementations, a software application associated with the smart TV can track and log media programming being displayed on the smart TV. The log, or user profile, can include a variety of data associated with TV viewing, such as the day of the week, the time the smart TV was turned on, the channel watched, how long the channel was watched, etc. After a number of log entries, the software application can analyze the data and anticipate when the user desires to watch TV, and which channel the user desires to view. In other words, the smart TV can be implemented to learn a user's TV watching preferences. For example, if a user powers on the smart TV around 7 am (i.e., between 6:50 and 7:10 am, or more specifically, between 6:55 and 7:05 am) and changes the channel to the morning news on channel 3, after a few days of tracking this behavior, the smart TV can be implemented to automatically turn on channel 3 at approximately 7 am.

In some implementations, the software application can employ neural network modelling. The neural network model can be implemented to dynamically train itself if a particular channel has been watched for more than a threshold time duration in a given hour. When a channel has been watched for a time duration greater than the threshold, the neural network model can be implemented to add this channel to a "favorite channel list." For example, if a user powers on the smart TV around 7 am and watches channel 3 for greater than an example threshold limit of 20 minutes, the neural network model can train itself to add channel 3 to the favorite channel list. The favorite channel list can be stored in memory at the smart TV, or in a software application associated with the smart TV, and can enable the user to choose from a list of more than one favorite channel at a particular time.

Additionally, according to the disclosed techniques, a smart TV can be implemented to detect a particular user's presence, and based on that detection, automatically change the TV channel to one desired by the user. In some implementations, the smart TV can employ a microphone or camera to detect a user's voice or face. The smart TV can include one or more software applications associated with voice recognition or face recognition, and once a particular user is detected, the smart TV can automatically turn on to the user's favorite channel based on the user profile, or to a channel showcasing programming that may be desirable to the user, based on an analysis of the user profile. For example, upon detecting a voice associated with a user profile, the smart TV can be implemented to turn on the channel most frequently watched by that user. As another example, and where the user has shown an affinity for watching sporting events, upon detecting the user's face and comparing it with an image of the user, the smart TV can be implemented to scan the channel listings for sporting event programming, before presenting either a sports-related program to the user, or a list of sports-related programming options to the user.

In some implementations, the smart TV can detect that the user is a child and can invoke parental control settings to restrict particular programming. For example, if the smart TV's microphone or camera detects a child attempting to access the smart TV without the supervision of an adult, i.e., no adult user is detected nearby, the smart TV can block certain channels from being accessed, or can automatically switch to a default channel, like the Disney® channel.

Alternatively, or additionally, the user can proactively identify themselves by using a fingerprint sensor integrated into any number of smart devices, such as a smartphone, a smart TV remote, etc., and loading a user profile based on the fingerprint to the smart TV. In such an implementation, upon identifying the user, the smart TV can be configured to turn on the user's favorite channel at that time of day, or configured to present a favorite channel list to the user based on the neural network model implementation.

In some implementations, in addition to providing customized channel selection, or a favorite channel list, based on the presence of a particular user, the smart TV can be configured to automatically adjust the volume and the brightness settings. The smart TV can be implemented to adjust the volume and brightness settings automatically based on, for example, ambient light conditions, time of the day, location of the TV within a house or building, user detection, and user's preferred viewing or display settings parameters, etc.

Moreover, according to the disclosed techniques, when upcoming media programming matches the user's preferences, or the user scheduled a reminder for a particular media program, the smart TV can transmit one or more instructions to local devices in an attempt to notify, or otherwise alert the user to the upcoming media programming. These instructions can command the local devices to present one or more audial or visual notifications related to the upcoming media programming. Returning to the example where the user has expressed an affinity for watching sporting events, before the start of a Major League Baseball World Series® game and where the user is outside of the smart TV's own detection zone, the smart TV can send one or more notification-related instructions to the user's smartphone device, tablet device, IoT device and wearable device, in an attempt to alert the user to the start of the baseball game. Additionally, or alternatively, the smart TV can instruct the local devices to detect a particular user's presence, and once the user is detected, the detecting local device can send a notification, or otherwise alert the user to the upcoming media programming. For example, the smart TV can instruct the smartphone device, tablet device, IoT device and wearable device to detect the user's presence, such as through voice or face recognition, and whichever device detects the user' presence can be implemented to notify the user of the impending start of the baseball game.

Particular implementations of the subject matter described in this disclosure can be implemented to realize one or more of the following potential advantages. By utilizing the artificial intelligence and machine learning techniques described herein, smart TVs can be implemented to turn on the user's desired programming automatically, thereby improving user experience. The automatic channel selection, the favorite channel list presentation, the automatic volume and brightness control adjustments, and even automatically turning on the smart TV itself, may prevent the user from missing critical moments of desired media programming. Additionally, by using the techniques described herein, users may enjoy personalized programming based on the user profile built by the smart TV's software algorithms, or neural network modelling. The personalized programming may be achieved by the smart TV selecting particular broadcast programming, or by initiating a particular application, such as Netflix®, HBO Go®, etc., based on the detection of a particular user. The detection mechanisms also can be used to improve parental control features on the smart TV, such as by restricting access to certain channels, such as those in a predefined list, or dynamically restricting access based on the content to be displayed on the smart TV. Moreover, routing notifications related to media programming to one or more electronic devices, may prevent the user from missing the viewing of the desired media programming. Furthermore, once an electronic device detects the user's presence through voice or facial recognition, the other electronic devices in the network can cease their detection efforts, as well as cease notifications efforts, thereby enabling a quieter environment.

FIG. 1 shows an example wireless communication system 100 including a smart TV 110, a first mobile device 120, a second mobile device 130 and an IoT device 140. The smart TV 110 also may be referred to as a connected TV, hybrid TV, or some other suitable terminology, which generally describes a television set with integrated connectivity features, and processing capabilities. The smart TV 110 is communicatively coupled (shown as line 152) to a communication network 150.

The first mobile device 120 and the second mobile device 130 also may be referred to as a wireless device, a remote device, a handheld device, or a subscriber device, or some other suitable terminology, where the "device" also may be referred to as a unit, a station, a terminal, or a client. The first mobile device 120 and the second mobile device 130 may be implemented as any computing device configured to receive, process and otherwise handle audio or visual or audio/visual (i.e., video) communications over a communications network. The first mobile device 120 also may be a personal electronic device such as a cellular phone, a smartphone, a personal digital assistant (PDA), a tablet device, a laptop computer, a personal computer, a gaming console, a virtual or augmented reality device, a drone, or other electronic system. In some implementations, the first mobile device 120, the second mobile device 130, or both may be considered a wearable device. Wearable devices also may be referred to as wearable technology, wearable gadgets, wearables, or some other suitable terminology, which generally describes electronics and software-based technology that is worn on the body, either as an accessory, or as part of material used in clothing. For ease in description, hereinafter, the first mobile device 120 will be referred to as a smartphone 120, and the second mobile device 130 will be referred to as a tablet device 130. The smartphone 120 is communicatively coupled (shown as line 154) to the communication network 150, and the tablet device 130 is communicatively coupled (shown as line 156) to the communication network 150.

The IoT device 140 also may be referred to as an IoE device, an IoT hub, and IoE hub, or any other physical device, vehicle, or home appliance that is embedded with electronics and network connectivity, which enable these objects to connect and exchange data. The IoT device 140 also may be referred to as a virtual assistant device, such as Amazon Alexa®, Google Home®, etc., a wearable device, such as smart watches, earbuds, headphones, Google Glass®, etc., an in-vehicle entertainment or communication system, a home security system, or any device having an interface to a communications network and suitable input and output devices. The IoT device is communicatively coupled (shown as line 158) to the communication network 150.

The communication network 150 enables devices to communicate with one another over a communication medium. Examples of protocols that can be used to form communication networks 150 can include, near-field communication (NFC) technology, radio-frequency identification (RFID) technology, Bluetooth, Bluetooth Low Energy (BLE), Zigbee, or Wi-Fi (i.e., Institute of Electrical and Electronics Engineers (IEEE) 802.11) technology, the Internet, or other such types of protocols described throughout this disclosure. The smart TV 110, the smartphone 120, the tablet device 130 and the IoT device 140 can communicate with each other using communication protocols provided by one or more of these example communication networks 150. A person having ordinary skill in the art will readily appreciate that the smart TV 110 may simultaneously employ multiple different wireless technologies to establish connections with various devices. For example, the smart TV 110 can connect to the smartphone 120 and the IoT device 140 using a Wi-Fi connection, while it is connected to the tablet device 130 via a Bluetooth connection. In some implementations, such as where the smart TV 110 is outside the range of, for example, the smartphone 120, other communication protocols can be employed. For example, device-to-device (D2D) protocols, long-term evolution direct (LTE-D), narrow band Internet of Things (NB-IoT), LTE category M (LTE CAT-M), Vehicle to X (V2X), etc., can be utilized to facilitate communication between the smart TV 110 and the smartphone 120. Any or all of these different technologies may be employed independently or concurrently according to different examples.

In some implementations, the smart TV 110 can be paired to one or more of the smartphone 120, the tablet device 130 and the IoT device 140 through one or more of the described communication protocols. The pairing of the devices can occur through the communication network 150, can occur directly between the devices, or can be established through a peer-to-peer relationship. Once paired, the devices can be implemented to exchange data and information. For example, the smart TV 110 can be implemented to transmit instructions to one or more of the smartphone 120, the tablet device 130 and the IoT device 140, and the smartphone 120, the tablet device 130 and the IoT device 140 can communicate with one another, including the smart TV 110, directly, or through another device, such as a wireless access point (AP). Upon receiving instructions, the smartphone 120, the tablet device 130 and the IoT device 140 can process the instructions and can perform one or more actions based on the processed instructions. The phrase "based on" does not mean "based only on," unless expressly specified otherwise. In other words, the phrase "based on" describes both "based only on" and "based at least on." In some implementations, processing the instructions can include determining an appropriate action to perform based on the received instructions. The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In some implementations, the one or more actions performed by the smartphone 120, the tablet device 130 and the IoT device 140 can include providing notifications, such as a push message, an SMS message, a Way2SMS message, an email message, an audio alert, or an audial message, in addition to other similar such notifications. For example, upon receiving instructions to provide a notification of upcoming media programming to the user, the tablet device 130 can be implemented to present a notification on the display interface of the tablet device 130 indicating that media programming is being presented on the smart TV 110. In some other implementations, the one or more actions performed by the smartphone 120, the tablet device 130 and the IoT device 140 can include turning on microphones, cameras, or sensors, such as detectors, biosensors, sensory receptors, gas sensors, image sensors, microelectromechanical systems (MEMS) sensors, and other such suitable sensors, in an attempt to detect the presence of a particular user within the device's vicinity. For example, upon receiving instructions to detect the presence of a particular user in the device's vicinity, the IoT device 140 can be implemented to enable the microphone and upon recognizing the user's voice, can provide an audial message informing the user that media programming on the smart TV 110 is about to commence. In some other implementations, the smart TV 110, the smartphone 120, the tablet device 130 and the IoT device 140 can be implemented to communicate with one another that the user has been detected by that particular device, and the other devices can cease their detection efforts.

In some implementations, the smart TV 110 can maintain a list or registry of devices that are connected, or have previously connected or registered with the smart TV 110. The list may identify each device and may include information about the capabilities of the devices. The capabilities can include whether or not the particular device has technical functionality related to audio input, audio output, video input, video output, voice recognition, and image recognition, in addition to other capabilities, such as whether or not the particular device has sensor functionality. For example, the list for the smartphone 120, the tablet device 130 and the IoT device 140 in this example may include data such as the following:

| ID | Connection Status | Audio Output | Audio Input | Video Output | Video Input | Voice Recognition | Image Recognition |
|---|---|---|---|---|---|---|---|
| 120 | Connected | Yes | Yes | Yes | Yes | Yes | Yes |
| 130 | Suspended/Available | Yes | Yes | Yes | Yes | Yes | Yes |
| 140 | Connected | Yes | Yes | No | No | Yes | No |
| X | Not Available | No | No | Yes | Yes | No | Yes |

In the example list above, each of the smartphone 120, the tablet device 130 and the IoT device 140 is represented, as well as their respective connection status. In addition, although not depicted, device X, which is not currently available, also can be included on the list. For example, device X may be powered off or out of range, and has video input and output capabilities, but not audio input and output capabilities.

Figure 2:
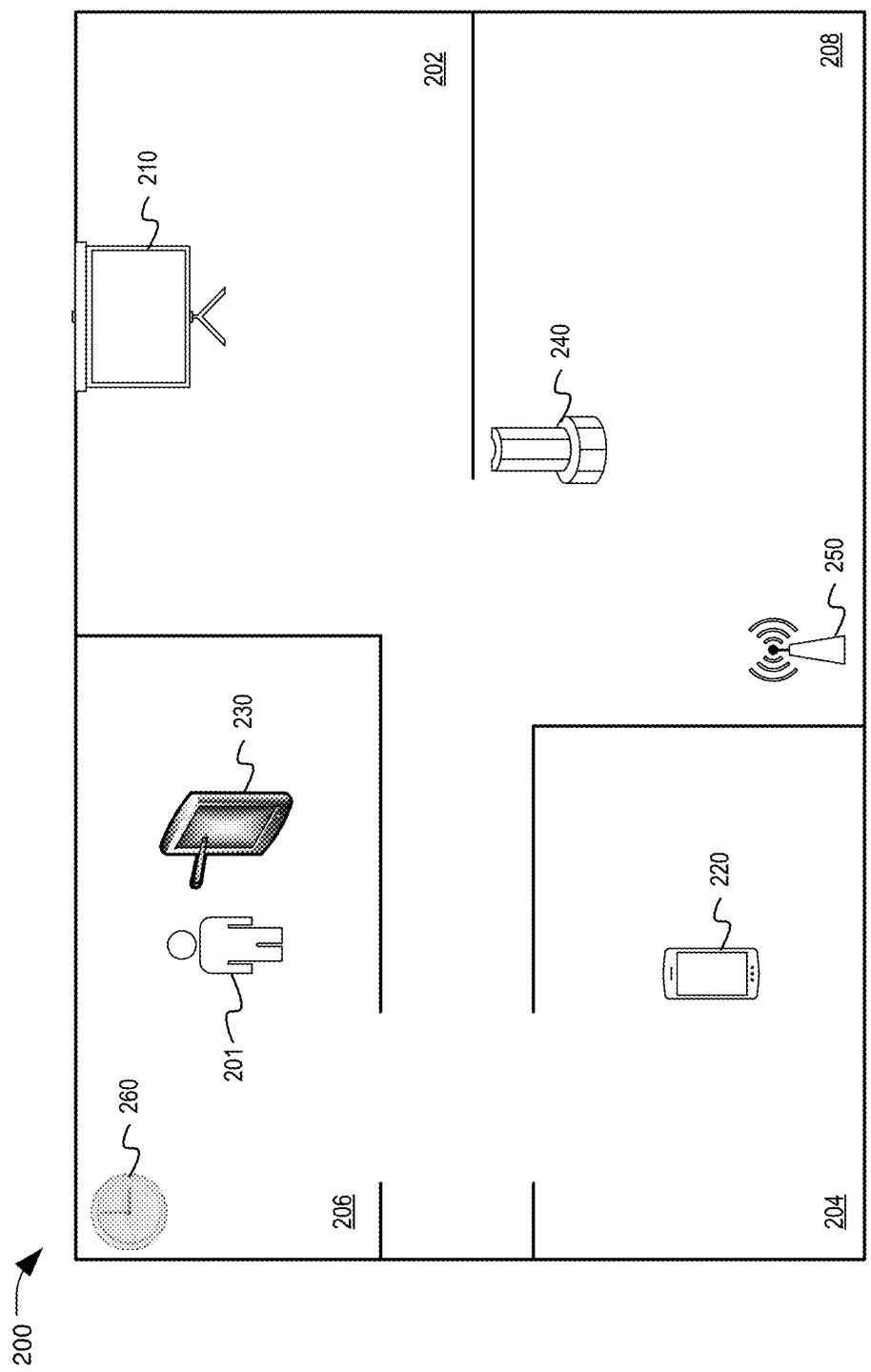
FIG. 2 shows a layout of an example environment for intelligent routing of notifications related to media programming.

FIG. 2 shows a layout of an example environment 200 for intelligent routing of notifications related to media programming. The depicted example can be representative of a user's 201 dwelling having multiple rooms, 202, 204, 206 and 208. A smart TV 210 is located in the living room 202, a smartphone 220 is located in the bedroom 204, a tablet device 230 is located in the study room 206, and an IoT device 240 and a wireless access point (AP) 250 are located in the kitchen 208. In the depicted example, the smart TV 210, the smartphone 220, the tablet device 230, and the IoT device 240 can be implemented to communicate with one another through the wireless AP 250. For example, the wireless AP 250 can be implemented to provide a Wi-Fi network throughout the dwelling for the smart TV 210, the smartphone 220, the tablet device 230, and the IoT device 240 to communicate.

As depicted, the user 201 is in the study room 206, browsing the Internet on the tablet device 230, and the clock 260 indicates the time is 3 pm. In this example implementation, the user 201 enjoys watching sporting event highlights on the smart TV 210. In some implementations, the user 201 can schedule a programming reminder on the smart TV 210 to turn on the sporting event highlight show, "SportsCenter" by ESPN® at 3 pm. In some other implementations, the smart TV 210 can track the user's 201 TV watching behavior over a period of time, and based on that tracked behavior, can automatically display SportsCenter at 3 pm without the user 201 scheduling a programming reminder. In such implementations, the smart TV 210 can employ one or more software algorithms to track and log the user's 201 TV viewing habits, and can build a user profile based on those TV viewing habits.

For example, if the user 201 turns on the smart TV 210 to a particular channel, such as the ESPN channel, at a particular time, or within a particular window of time, such as between 2:55 pm and 3:05 pm, on a periodic basis, such as every Monday, Wednesday and Friday, after one week of tracking and logging the user's TV viewing habits, the smart TV 110 can be configured to automatically turn on, or turn to, the ESPN channel at 3 pm for each subsequent Monday, Wednesday and Friday. In some implementations, one or two days may be a sufficient period of time for the software algorithms to track the user's 201 TV viewing habits, build a user profile based on those habits, and determine an appropriate channel, or TV application, to display. In some other implementations, the period of time may be three, four or five days, or one or two weeks, or even one or more months, before an appropriate user profile is established and TV viewing habits can be predicted. A person having ordinary skill in the art will readily recognize that the tracking period can vary based on the smart TV, the software application, or the original equipment manufacturer's implementation, in addition to the consistency of the user's viewing habits. Once the user profile is established, the software algorithm operating on the smart TV 210 can be implemented to identify media programming potentially of interest to the user based on analyzing the user profile.

In some implementations, the user's interests may change over time, therefore, the software algorithm can track when the user 201 changes the channel away from the programming selected by the smart TV 210. After a number of times, such as the user 201 changing the channel twice, three times, four times, five times, etc., the software algorithm can be implemented to determine a new channel which is likely desired by the user 201. For example, after the user 201 actively changes the channel from SportsCenter to the cooking channel on Monday and Wednesday afternoons, by Friday at 3 pm, the software algorithm may be configured to update the user profile, and replace the SportsCenter preference with the cooking channel preference at 3 pm.

Since the user 201 enjoys watching sporting highlights, but is located in the study room 206 and away from the living room 202 where the smart TV 210 is located, it would be desirable to notify the user 201 that the media programming is commencing. As disclosed herein, the smart TV 210 can be implemented to communicate with the smartphone 220, the tablet device 230, and the IoT device 240, and instruct the devices to notify the user 201 of the upcoming media programming scheduled to be displayed on the smart TV 210. In some implementations, the smart TV 210 can instruct each of the smartphone 220, the tablet device 230, and the IoT device 240 to present a notification to the user. If in textual form, the notification may read, for example, and certainly not limited to, "Media Programming starting now," or "Media Programming starting in five minutes," or "Now: SportsCenter on channel ESPN," or other such similar textual notifications, alerting the user 201 that the desired TV show is playing. If in audial form, the audio notification may state, for example, and certainly not limited to, "Alert, Media Programming commencing," or "Now playing on the Smart TV, SportsCenter on ESPN," or other such types of audio notifications, again alerting the user 201 that the desired media program is scheduled to start. In some other implementations, the user 201 can program the smart TV 210 to instruct only one of the smartphone 220, the tablet device 230, and the IoT device 240 to present a notification to the user 201. For example, if the user 201 spends afternoons in the study room 206, the user 201 can program the smart TV 210 to instruct only the tablet device 230, which is located in the study room 206, to present a media programming notification to the user 201.

In some implementations, the smart TV 210 can be implemented to adjust its volume and brightness settings based on one or more criteria. The criteria can include time of the day, day of the week, ambient light conditions, location of the TV within a house or building, user detection, and one or more of the user's preferred viewing or display settings parameters. The volume and brightness settings can be predefined or programmed by the user 201 using one or more smart TV 210 interfaces. For example, the user 201 can program the volume settings to not exceed 25% of the maximum smart TV 210 volume when the smart TV 210 is operating past 10 pm. In such an implementation, by automatically controlling the volume of the smart TV 210 late at night, the smart TV 210 may not wake the user's 201 family members who are trying to sleep. In another example, the user 201 can program the brightness settings to not exceed 50% of the maximum smart TV 210 brightness when the smart TV is operating past 10 pm. Or alternatively, the user 201 can program the brightness settings to be at least 50% of the maximum smart TV 210 brightness when the smart TV is operating in the day time between the hours of 11 am and 4 pm. A person having ordinary skill in the art will readily recognize that other smart TV 210 volume and brightness settings may be desirable based on the particular living circumstances.

In some other implementations, the smart TV 210 can be implemented to adjust its volume and brightness settings based on artificial intelligence and machine learning. Artificial intelligence, or machine learning capabilities, residing in the processor or memory of the smart TV 210 can be implemented to adjust or otherwise control the volume and brightness settings at the smart TV 210. Using similar criteria to the implementation described above, plus recognition and analysis of the user's 201 viewing patterns, artificial intelligence or machine learning algorithms in the smart TV 210 can be implemented to showcase, or select, the user's 201 favorite channel, present a favorite channel list, and to automatically adjust the volume and brightness when the user 201 is detected. For example, after the smart TV 210 has been turned on, or the channel has been changed, the smart TV 210 can be implemented to detect the user's 201 presence using face, voice or fingerprint recognition, the techniques of which are further described below. Additionally, the smart TV 210 can be implemented to identify the time of day, the day of the week, and to sense or otherwise detect ambient light through one or more sensors, as described below. Based on the detected user, the time of day, day of the week and ambient lighting conditions, the smart TV's 210 artificial intelligence or machine learning algorithms can be implemented to predict suitable volume and brightness settings for the particular user 201. If the user 201 desires other volume or brightness settings at that particular time of day, and in those conditions, the smart TV 210 can be implemented to log these changes in volume and brightness and store the settings in the user profile, or other user behavior database, where the new entries will be recognized and analyzed by the artificial intelligence or machine learning algorithms associated with the smart TV 210. In some implementations, the artificial intelligence or machine learning algorithms can be stored remotely from the smart TV 210, such as in the cloud, or on a remote server. Examples of non-limiting artificial intelligence or machine learning algorithms that can be utilized include time series algorithms, such as recurrent neural networks (RNN), or long short term memory (LSTM).

Throughout this disclosure, descriptions of the media programming can be representative of a live television program, a recorded television program, a broadcast television program, or an application-provided program. Application-provided programs can include such non-limited examples like Netflix, HBO Go, Amazon Video®, Hulu®, Roku®, Chromecast®, etc. In some implementations, when a user 201 receives a notification that an application-provided program is scheduled to begin, through the device receiving the notification, the user 201 can instruct the smart TV 210 to open the application-provided program and commence playing the program. For example, at 7:57 pm, the user 201 may receive a notification that "Game of Thrones®" is playing at 8 pm on the application HBO Go on the tablet device 230. Upon receipt of that notification, the user 201 may provide input (such as tactile or voice input) at the tablet device 230 which instructs the smart TV 210 to open the HBO Go application and commence playing the Game of Thrones episode.

Figure 3:
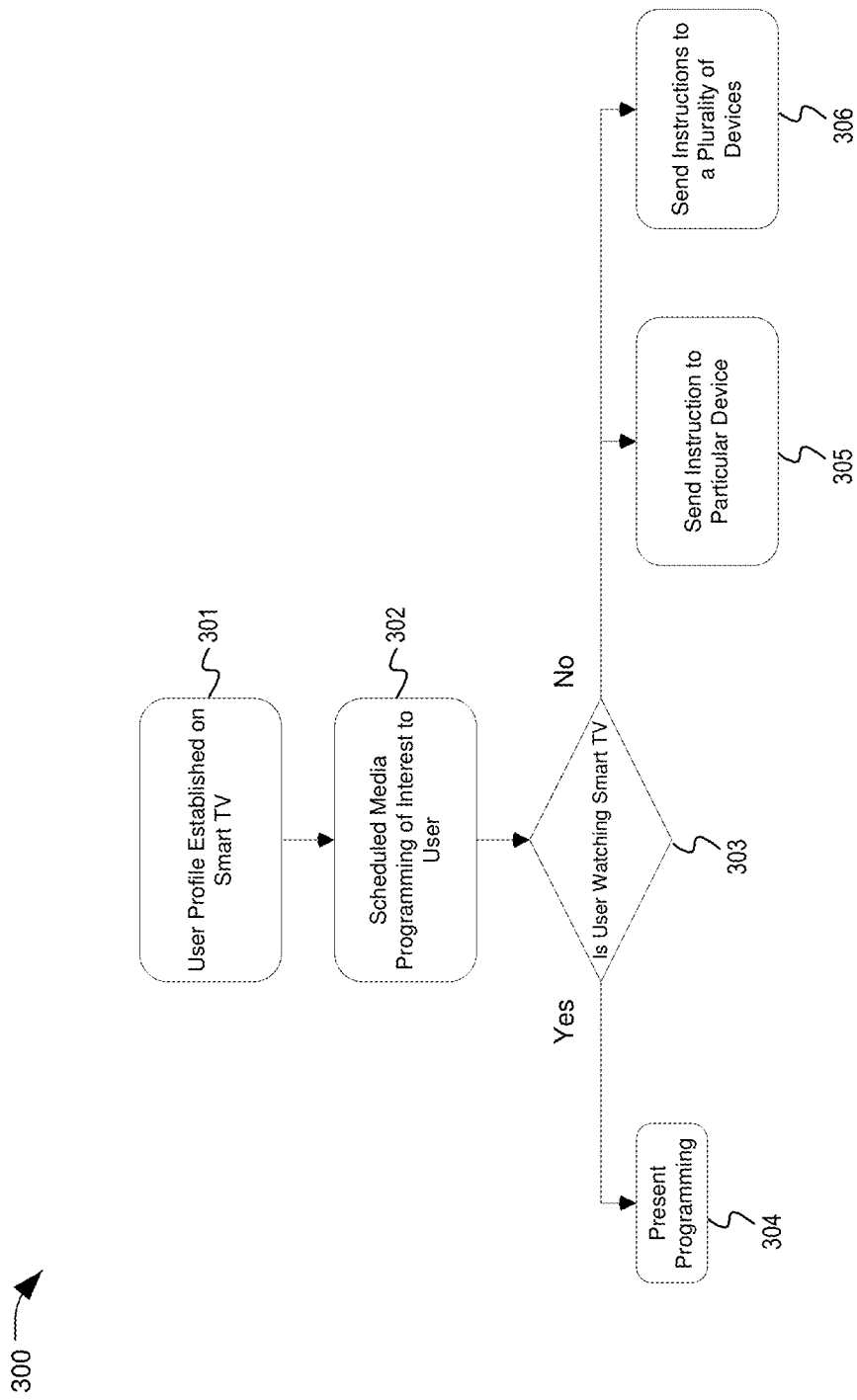
FIG. 3 shows an example flowchart for intelligent routing of notifications related to media programming.

FIG. 3 shows an example flowchart 300 for intelligent routing of notifications related to media programming. At block 301, a user profile can be established on the smart TV. The user profile can be established via user login, such as through a username and password combination on a smart TV login interface. For example, the user can login through the smart TV's own interface, such as by entering their Samsung.com or LG.com account information, or the user can login through one or more commercial applications, such as Facebook®, Google®, etc. Alternatively, the user profile can be established based on the user's fingerprints. Using a fingerprint sensor integrated into one or more of the smart TV 210's remote control, the smartphone 220, the tablet device 230 or the IoT device 240, the user 201 can upload fingerprint data to be used as a basis for a user profile. The smart TV can be implemented to keep the user logged in until the user logs out, or until another user logs in. The user profile can include a variety of information about the user's TV viewing habits, such as the user's interests, favorite shows, favorite channels, favorite genres, popular viewing times, popular viewing days, etc.

At block 302, based on the user's profile, the smart TV can recognize that scheduled media programming is of interest to the user. In some implementations, the smart TV will note the scheduled media programming in the user's profile, and will be prepared to turn on the media programming at the scheduled time.

When the scheduled time arrives, at decision block 303, the smart TV determines if the user is watching the smart TV. In some implementations, the smart TV can determine that the user is watching the smart TV by reviewing the user login information. In some other implementations, the smart TV can determine that the user is watching the smart TV based on the user's TV viewing habits. In some further implementations, the smart TV can determine that the user is watching the smart TV based on employing a camera associated with the smart TV to detect the user's face, or a microphone associated with the smart TV to detect the user's voice. In such an implementation, the smart TV can compare a user profile picture, or another such picture, to the user's face, or utilize a voice recognition technique to compare the user's voice to a recorded voice sample.

If the user is watching the smart TV, at block 304, the media programming is presented. If the user is not presently watching the smart TV, at block 305, the smart TV can be implemented to send an instruction to a particular device. For example, the smart TV can send an instruction to the user's preferred electronic device, such as the tablet device 230 in the example described with respect to FIG. 2. Upon receiving the instruction, the preferred electronic device can present a media programming-related notification to the user. Alternatively, at block 306, the smart TV can be implemented to send one or more instructions to a plurality of electronic devices, such as the smartphone 220, the tablet device 230, and the IoT device 240 as described with respect to FIG. 2. Upon receiving the instructions, the plurality of electronic devices can present media programming-related notifications to the user. In some implementations, the plurality of electronic devices will present, or otherwise deliver, the notifications on a periodic basis. For example, the electronic devices can send an initial notification, and send follow on notifications every three, four, five, etc., minutes until the user dismisses the notifications, or until the smart TV indicates that the user is now watching the smart TV and the notifications are to cease.

Figure 4:
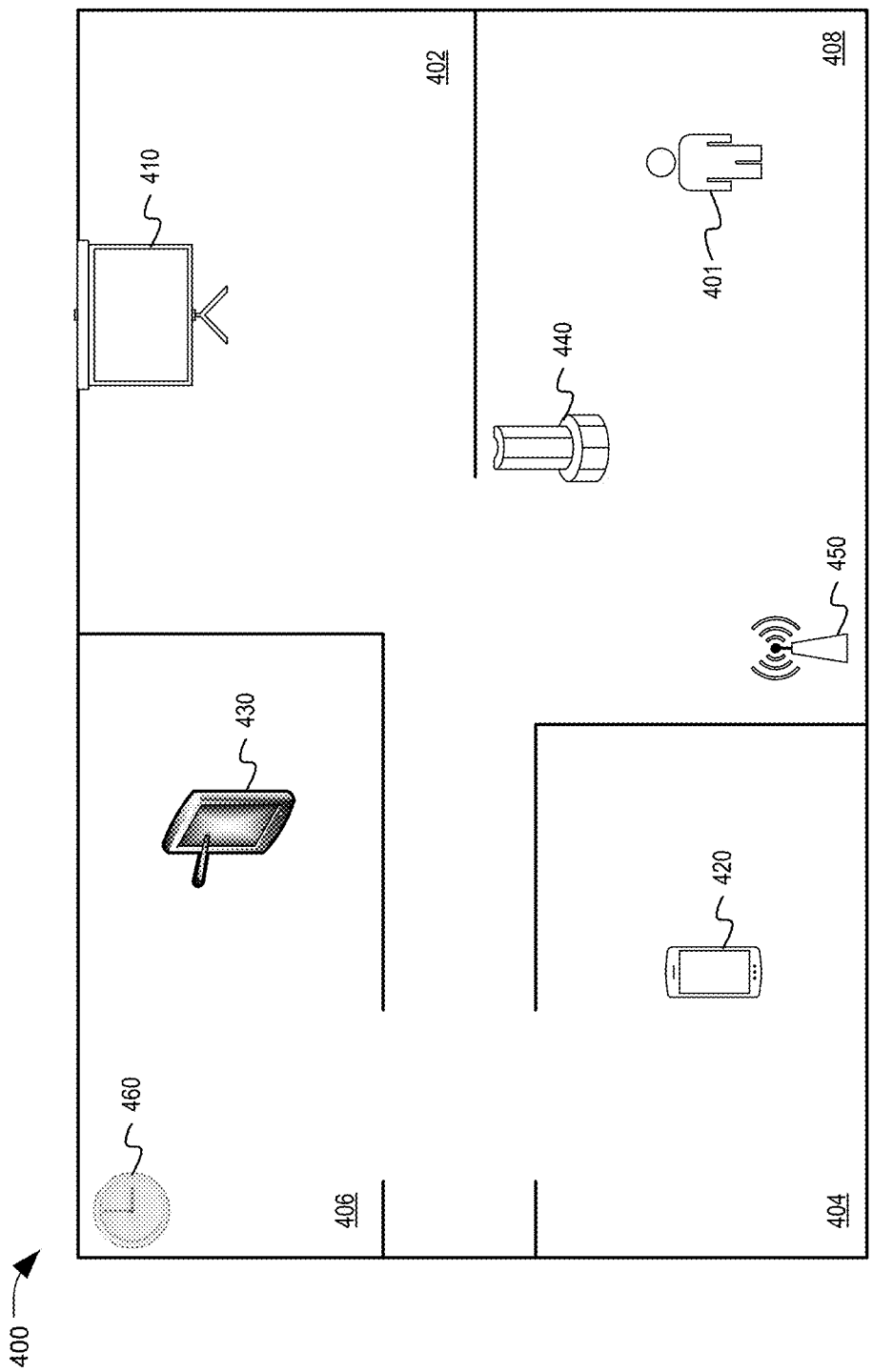
FIG. 4 shows a layout of another example environment for intelligent routing of notifications related to media programming.

FIG. 4 shows a layout of an example environment 400 for intelligent routing of notifications related to media programming. Similar to the environment 200 depicted in FIG. 2, a smart TV 410 is located in the living room 402, a smartphone 420 is located in the bedroom 404, a tablet device 430 is located in the study room 406, and an IoT device 440 and a wireless access point (AP) 450 are located in the kitchen 408. Also, similar to the environment 200 depicted in FIG. 2, the smart TV 410, the smartphone 420, the tablet device 430, and the IoT device 440 can be implemented to communicate with one another through the wireless AP 450. In this depicted example, the user 401 is located in the kitchen 408, and the clock 460 indicates the time is 3 pm. Like the example in FIG. 2, SportsCenter is scheduled to be displayed on the smart TV 410 at 3 pm, and the smart TV 410 does not detect the user's presence in the living room 402. Therefore, the smart TV 410 begins to instruct the connected devices to present a notification to the user 401 indicating that media programming, potentially of interest, is commencing on the smart TV 410.

When the smart TV 410 instructs each of the smartphone 420, the tablet device 430, and the IoT device 440 to send media programming-related notifications to the user 401, the user 401, and other people in the vicinity, may be irritated by the multiple contemporaneous notifications. To reduce the annoyance or inconvenience of multiple devices sending contemporaneous notifications, the smart TV 410 can instead be implemented to instruct the smartphone 420, the tablet device 430, and the IoT device 440 to attempt to detect the user's presence, and the device that is most proximate to the user 401 will provide a media programming-related notification to the user 401.

In some implementations, the smart TV 410 can instruct, or otherwise command, the smartphone 420, the tablet device 430, and the IoT device 440 to activate its respective microphone to attempt to detect the user's voice. The smartphone 420, the tablet device 430, and the IoT device 440 may activate its respective microphones and begin receiving audio signals. As the smartphone 420, the tablet device 430, and the IoT device 440 receive audio signals from their activated microphones, they perform voice recognition to attempt to recognize one or more voices based on the received audio signals. The smartphone 420, the tablet device 430, and the IoT device 440 can be implemented to perform voice recognition on the received audio signals, or can forward the received audio signals to another computing device to perform voice recognition. Some non-limiting examples of voice recognition techniques include Mel-Frequency Cepstral Coefficients (MFCC), Dynamic Time Wrapping (DTW), Hidden Markov models (HMMs), neural networks models, and end-to-end automatic speech recognition (ASR). In some implementations, the smartphone 420, the tablet device 430, and the IoT device 440 may obtain further information about the received audio signals, such as an amplitude of the one or more detected voices, signal-to-noise ratios (SNR), voice strength signals, etc. The further information may be used to determine a relative distance from the respective device to the user 401.

In some implementations, the smart TV 410 may provide a name, user identification, user profile, or other information to the smartphone 420, the tablet device 430 and the IoT device 440 to identify each recognized voice. In addition, the smart TV 410, the smartphone 420, the tablet device 430 and the IoT device 440 may provide information related to the voice information, such as a quality or confidence rating of the voice recognition, SNR information, etc., to the other electronic devices. For example, the audio signals received by the IoT device 440 may include faint voice information, such as if the speaker is too distant from the microphone for detection. Alternatively, background noise may interfere with the voice recognition techniques, and as such, a SNR value may be low, or a confidence rating for the recognized voice(s) may be too low to ascertain the particular user. Such information may be provided to the smart TV 410 along with information about one or more recognized voices. In some implementations, the smart TV 410 also may activate its own microphone in an attempt to detect the user's voice.

Upon recognizing the user's 401 voice based on the received audio signals, the recognizing device can be implemented to identify itself to the other devices. In some implementations, the other devices can deactivate their microphones, and return to standby operation. In some other implementations, the other devices can keep the respective microphones activated until they receive instructions from the smart TV 410, or another device in the communication network, to deactivate the microphone and return to standby operation. The recognizing device can present the media programming-related notification to the user 401. For example, with the user 401 located in the kitchen 408, and upon recognizing the user's 401 voice from the received audio signals, the IoT device 440 can request or instruct the smart TV 410, the smartphone 420 and the tablet device 430 to deactivate their respective microphones. The IoT device 440 also can present an audio notification to the user 401 indicating that desired media programming is commencing on the smart TV 410.

After receiving information about recognized voices from one or more of the smartphone 420, the tablet device 430 and the IoT device 440, and performing voice recognition on its own obtained audio signals, the smart TV 410, or the devices themselves, can determine whether the user was identified by any of the devices. If the user was identified by one device, the smart TV 410 can then transmit instructions to that device to generate a notification to alert the user of the upcoming media programming. If the user was identified by multiple devices, the smart TV 410 can determine which of the devices to select, and transmit the instructions to that device, or it can select multiple devices and transmit instructions to each device. For example, if the user 401 was located in between the bedroom 404 and the study room 406, the smart TV 410 may select either the smartphone 420, or the tablet device 430, or both, based on different factors, such as strength of the respective audio signals, the SNR of the respective audio signals, etc., to provide a notification to the user 401.

In some other implementations, the smart TV 410 can instruct the smartphone 420, the tablet device 430, and the IoT device 440 to activate its camera to attempt to detect the user's face or facial side-profile. The smartphone 420, the tablet device 430, and the IoT device 440 may activate its respective camera, if applicable, and begin receiving visual signals. In some implementations, the smart TV 410 also may activate its own camera in an attempt to detect the user's face. The visual signals can include one or more captured images. The smartphone 420, the tablet device 430, and the IoT device 440 can be implemented to perform facial recognition on the received visual signals, or can forward to received visual signals to another computing device to perform facial recognition. Some non-limiting examples of facial recognition techniques include multilayer perception (MLP), geometric recognition, photometric recognition, eigenfaces, linear discriminant analysis, elastic bunch graph matching, HMMs, dynamic link matching, three-dimensional face recognition, skin texture analysis, or utilizing thermal cameras. The smartphone 420, the tablet device 430, and the IoT device 440 may provide the smart TV 410 with an indication that one or more individuals are recognized within the image(s), or an indication that no individuals were recognized. When one or more individuals are recognized, the smart TV 410, the smartphone 420, the tablet device 430, and the IoT device 440 can be implemented to compare the faces, or side-profiles, of the individuals with one or more images, or photos, associated with the user's 401 stored user profile. In some implementations, the smart TV 410, the smartphone 420, the tablet device 430, and the IoT device 440 may obtain further information about the received visual signals, which may be used to determine a relative distance from the respective device to the recognized individuals based on the captured images.

In some implementations, the smart TV 410, the smartphone 420, the tablet device 430, and the IoT device 440 may attempt to recognize the identified individuals and determine relative distances to one or more of the recognized individuals. For example, the smartphone 420 can employ one or more face identification or facial recognition techniques to identify and recognize individuals from one or more captured images, as well as the relative distance to the identified individual. In some implementations, the smart TV 410, the smartphone 420, the tablet device 430, and the IoT device 440 may instead transmit one or more captured images to a remote computing device, which then attempts to identify and recognize one or more individuals in the captured images. The remote computing device may then provide to the smart TV 410, the smartphone 420, the tablet device 430, or the IoT device 440 an indication of one or more individuals recognized within the image(s) or an indication that no individuals were recognized.

Upon recognizing the user's 401 face based on the received visual signals, the recognizing device can be implemented to identify itself to the other devices. In some implementations, the other devices can deactivate cameras, and return to standby operation. In some other implementations, the other devices can keep the camera activated until they receive instructions from the smart TV 410, or another device in the communication network, to deactivate the camera and return to standby operation. The recognizing device can present the media programming-related notification to the user 401.

In some other implementations, the smart TV 410 can instruct the smartphone 420, the tablet device 430, and the IoT device 440 to activate one or more sensors to attempt to detect the user's presence. Similar to the audio and facial recognition techniques described above, the smartphone 420, the tablet device 430, and the IoT device 440 can utilize one or more sensors to determine which device is nearest to the user 401, and that device can be implemented to provide the media programming-related notification.

Figure 5:
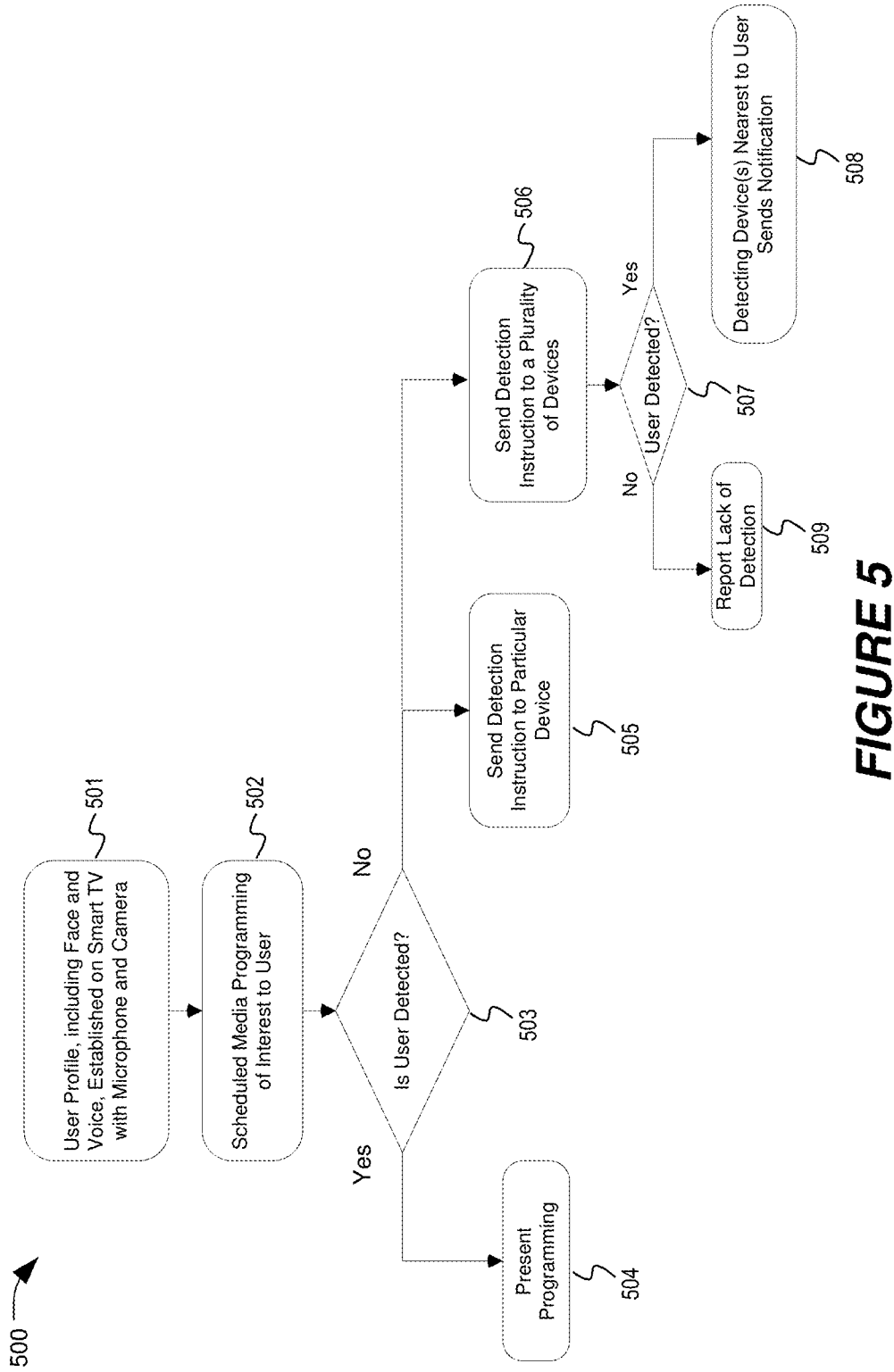
FIG. 5 shows another example flowchart for intelligent routing of notifications related to media programming.

FIG. 5 shows an example flowchart 500 for intelligent routing of notifications related to media programming. At block 501, a user profile can be established on the smart TV. The smart TV can include at least one of a microphone, a camera, and one or more other sensors, such as an ambient light sensor, detectors, biosensor, sensory receptors, image sensors, microelectromechanical systems (MEMS) sensors, etc. Similar to the description related to FIG. 3, the user profile can be established via user login, such as through a username and password combination on a login interface. For example, the user can login through the smart TV's own interface, such as be entering their Samsung.com or LG.com account information, or the user can login through one or more commercial applications, such as Facebook, Google's Gmail, etc. Alternatively, the user profile can be established based on the user's fingerprints. The smart TV can be implemented to keep the user logged in until the user logs out, or until another user logs in. The user profile can include a variety of information about the user's TV viewing habits, such as the user's interests, favorite shows, favorite channels, favorite genres, popular viewing times, popular viewing days, etc.

Additionally, the user's profile can include the user's face and the user's voice. For example, the smart TV can be implemented to store one or more images associated with the user's face. The images may be captured by the smart TV camera, or may be received from another source, such as through the login information, or one or more commercial applications, such as Facebook, Gmail, etc. In addition, the smart TV can be implemented to store audio information associated with the user's voice. The audio information may be captured by the smart TV microphone, or may be received from another source, such as from an IoT hub, or virtual assistant device, such as Amazon Alexa®, Google Home®, etc. In some implementations, the user profile, including images associated with the user's face and audio information associated with the user's voice, can be stored locally in memory at the smart TV, whereas in some other implementations, the information associated with the user can be stored remotely, such as on a server, or in the cloud, and accessible by the smart TV.

At block 502, based on the user's profile, the smart TV can recognize that scheduled media programming is of interest to the user. The media programming may be selected in advance by the user, or can be selected by the smart TV based on the user's profile. The smart TV can be implemented to change the channel to the media programming at the scheduled time. In some implementations, the smart TV can be implemented to turn itself on, and substantially simultaneously, to turn the channel to the media programming within a particular window of the scheduled time.

When the scheduled time arrives, at decision block 503, the smart TV detects if the user is in the vicinity of the smart TV. In the example implementation described in FIG. 5, the smart TV can employ the microphone, camera, or other sensor to detect the user's presence. For example, the camera can be used to detect the user's face, by capturing one or more images and comparing the captured images to images stored with the user profile. Alternatively, the microphone can be used to detect audio signals, and can compare the detected audio signals with stored audio information associated with the user's voice.

In some implementations, the smart TV may detect that the user is a minor, or more specifically, a child, and that no adults are detected in the vicinity. Based on the detection, and after accessing the minor user's profile, the smart TV can be implemented to turn on parental controls to restrict the media programming accessible to the minor. The parental control settings can be predefined or programmed in advance, such as by an adult, to restrict access to certain channels, or certain media programming, or can be dynamically determined by artificial intelligence or machine learning algorithms operating at the smart TV. For example, the parental control settings may be implemented to restrict access to channels displaying adult content, such as HBO, or to media programming having adult content restrictions contained therein, such as Game of Thrones. In another example, the smart TV can be implemented to dynamically restrict access to media programming when the smart TV detects audible cursewords. Conversely, if the smart TV also detects an adult in the vicinity, as well as the minor, the smart TV can be implemented to display the media programming as intended. If the user is detected, at block 504, the smart TV presents the media programming. If the user is not detected, at block 505, the smart TV can be implemented to send a detection instruction to a particular device. For example, the smart TV can send a detection instruction to the user's default, programmed, or preferred electronic device. Upon receiving the detection instruction, the electronic device can be implemented to enable one or more of its microphone, camera (if applicable), or sensors to detect the user's presence in the vicinity of the electronic device. If the user is detected, the electronic device can notify the smart TV of the positive detection, and can present, or otherwise deliver, a media programming-related notification to the user. If the user is not detected, the electronic device can notify the smart TV of the lack of detection.

Alternatively, at block 506, the smart TV can be implemented to send detection instructions to a plurality of electronic devices, such as the smartphone 420, the tablet device 430, and the IoT device 440, as described with respect to FIG. 4. Upon receiving the detection instructions, the plurality of electronic devices can be implemented to enable one or more of each respective device's microphone, camera (if applicable), or sensors to detect the user's presence in the vicinity of the electronic device. In some implementations, multiple individuals may be detected by the plurality of electronic devices, or by the smart TV itself. The detection techniques employed by the electronic devices can include recognition techniques, including voice recognition, facial recognition, object recognition, etc., for identifying the correct individual. Suitable voice, facial or object recognition techniques may employ neural networks, including deep neural networks, HMM, spectral or cepstral analysis techniques, dynamic time warping techniques, in addition to other techniques described in this disclosure, as well as other similar suitable techniques, etc. For example, detected and received audio signals may be provided to, and processed by, a voice recognition technique or software algorithm, in an attempt to recognize one or more voices recorded within the audio signals. Additionally, detected and received video signals may be provided to, and processed by, a facial recognition technique or software application to analyze in an attempt to identify one or more faces. Indications of the recognized voices or faces may be received by the plurality of electronic devices from such recognition techniques. For example, the indications may include a name, a user profile ID, or some other identifier recognizable by the plurality of electronic devices.

If the user is detected, at block 507, the detecting electronic device can present, or otherwise deliver, one or more media programming-related notifications to the user (block 508). The electronic device can be implemented to send a single notification, several notifications, or persistent notifications until the user snoozes or dismisses the electronic device, or until the user is detected in the vicinity of the smart TV. In some implementations, the detecting electronic device can notify the smart TV, the remainder of the plurality of electronic devices, or both, of the positive detection, in addition to presenting the media programming-related notification to the user. Based on the detection notification from the detecting device, the smart TV can instruct the remainder of the plurality of electronic devices to disable their respective microphones, cameras and sensors. If the user is not detected, at block 507, the electronic device(s) can notify the smart TV, the remainder of the plurality of electronic devices, or both, of the lack of detection (block 509). In such an implementation, the smart TV may reissue further detection instructions to the plurality of electronic devices.

Figure 6:
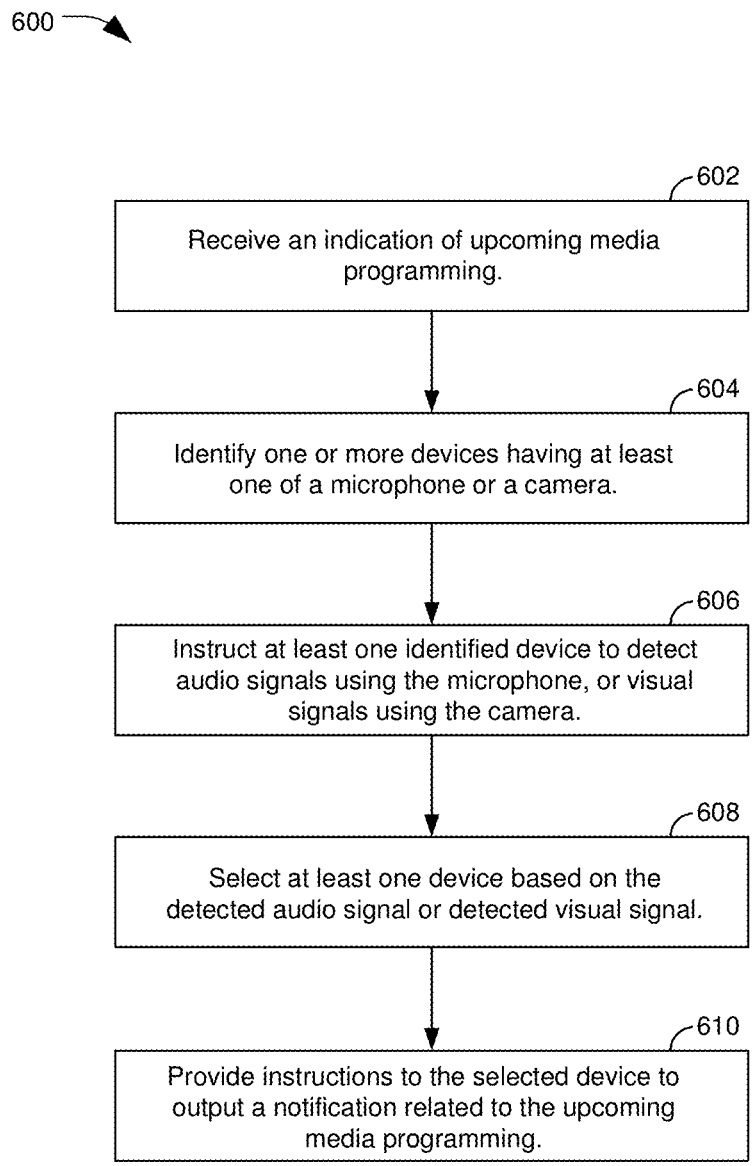
FIG. 6 shows an example method for intelligent routing of notifications related to media programming.

FIG. 6 shows an example method 600 for intelligent routing of notifications related to media programming. The operations of the method 600 may be implemented by the smart TV 110, 210 and 410 depicted and described in FIGS. 1, 2 and 4, or its components as described throughout. Additionally, or alternatively, the operations of the method 600 also may be implemented by one or more of the smartphone 120, 220 and 420, the tablet device 130, 230 and 430, or the IoT device 140, 240 and 440 (collectively, "the connected devices"), depicted and described in FIGS. 1, 2 and 4, or components of these connected devices as described throughout.

In some implementations, the described smart TVs 110, 210 and 410, or any of the connected devices, may execute a set of codes to control the functional elements of the respective device, or of one or more other devices, to perform the functions described in FIG. 6. Additionally, or alternatively, the described smart TVs 110, 210 and 410, or any of the connected devices, may perform aspects of the functions described in FIG. 6 using special-purpose hardware. In some implementations, the described smart TVs 110, 210 and 410, can be paired with one or more of the connected devices.

At block 602, an indication of upcoming media programming can be received. The indication may be received by the smart TV 110, 210 and 410. In some implementations, the indication may be received by another one of the connected devices. The indication may be a media programming reminder, previously input by a user at the smart TV 110, 210 and 410. Alternatively, the indication may be a scheduled showing of a particular type of media programming, where the user previously expressed interest. For example, if the user has previously watched episodes one, two and three of a TV series, the indication may include information related to episodes four and five, etc., of the same TV series. Moreover, one or more software applications operating at the smart TV 110, 210 and 410 may identify media programming that the user might find desirable, based on the user's TV viewing habits, or a user profile associated with the user. For example, using artificial intelligence or machine learning, the smart TV 110, 210 and 410 may predict that the user will be interested in a history show depicting the Vietnam War, based on the user's previous TV viewing interest in World War II history shows. In some implementations, the upcoming media programming may be scheduled for immediate presentation, while in some other implementations, the upcoming media programming may be scheduled for future presentation, such as later that day, later that week, later that month, etc.

At block 604, one or more devices having at least one of a microphone or a camera can be identified. The smart TV 110, 210 and 410 can be implemented to identify one or more devices, such as one or more of the connected devices, which include a microphone, a camera, or both. For example, with relation to the connected environment in FIG. 2, the smart TV 210 can communicate with the smartphone 220, the tablet device 230 and the IoT device 240, and can identify that all three connected devices include microphones, as well as speakers, but only the smartphone 220 and the tablet device 230 include cameras. In some implementations, the smart TV 110, 210 and 410 may identify another smart TV device. In such implementations, the other smart TV device can be configured to play the media programming on its own display interface.

At block 606, at least one identified device can be instructed to detect audio signals using the microphone, or visual signals using the camera. The smart TV 110, 210 and 410 can be implemented to instruct at least one identified device to commence the detection of audio signals via the microphone, or visual signals via the camera. The connected devices can be instructed to detect for audio signals using the microphone, or to detect for visual signals using the camera.

The smart TV 110, 210 and 410 can be implemented to request that each of the connected devices, including the smart TV 110, 210 and 410 itself, or another smart TV, activate a microphone and begin listening for the user's voice. If the user's voice is recognized near one of the connected devices, or the smart TV itself, the smart TV 110, 210 and 410 may request only that device to remain activated. Additionally, the smart TV 110, 210 and 410 can be implemented to request that each of the connected devices, including the smart TV 110, 210 and 410, activate a camera and begin capturing images to try to optically locate the user, or alternatively, scanning for the user's face. The smart TV 110, 210 and 410 or the connected devices may determine whether the user is identified in any of the captured images or face scans, and if so, request only that device in the closest proximity to the user to remain activated.

In some implementations, one or more of the connected devices, including the smart TV 110, 210 and 410, can detect distances, including relative distances, to the detected audio or visual signals.

At block 608, at least one device can be selected, based on the detected audio signal or detected visual signal. The smart TV 110, 210 and 410 can be implemented to select at least one device, based on the detected audio signal or visual signal. One or more of the connected devices can be selected, in addition to another smart TV, based on the audio or visual signals detected by the respective device. In some implementations, one or more of the connected devices can be selected, based on the audio or visual signals detected by one of the other connected devices.

In some implementations, the device may be selected based on the strength of the audio signal detected, the amplitude of the audio signal detected, radio signal-based detection, or the SNR of the audio signal detected. In some other implementations, the device may be selected based on the clarity of the visual signal detected, the depth of the visual signal detected, or the accuracy of the visual signal detected. In some implementations, the device may be selected based on the determined distance to the audio or visual signal, thereby providing an additional metric by which to select a device.

At block 610, instructions can be provided to the selected device to output a notification related to the upcoming media programming. The smart TV 110, 210 and 410 can be implemented to provide one or more instructions to the selected device, or devices, to output a notification related to the upcoming media programming. While the smart TV 110, 210 and 410 may be connected to each of the connected devices, rather than outputting a notification from each of these connected devices, as well as the smart TV itself, the smart TV 110, 210 and 410 may instead attempt to determine a subset, or a single device, of the connected devices to output the notification. Once instructed, any one, or more, of the connected devices, including the smart TV 110, 210 and 410, can be implemented to output a media programming-related notification. The media programming-related notification can be an audio notification (such as a verbal reminder, an announcement, an alert, an alarm, ringing, or sounds associated with the media programming, for example "This is Saturday Night Live," etc.), a textual notification (such as a pop up message box, an email, a text message, a Way2SMS message, flashing letters or words, etc.), or a visual notification (such as images, video clips, or flashing lights, etc.) aimed at gaining the user's attention, and informing the user that media programming of interest may be presented on the smart TV 110, 210 and 410.

While the example method 600 in FIG. 6 includes five discrete blocks, a person having ordinary skill in the art will readily recognize that other blocks can be inserted between the depicted blocks. Additionally, other blocks may be performed before or after certain depicted blocks.

FIG. 7 shows an example training data table 700 used for a neural network model. As previously mentioned, a neural network model can be implemented to determine a favorite channel, favorite channels, or favorite media programming at a particular time for one or more users. Using a threshold time duration as a basis for determining a user's favorite channel, the neural network model can dynamically train itself to learn a user's favorite channels, and present those channels in a favorite channel list to the user throughout the day.

The example training data table 700 includes columns for time of day (i.e., 7 or 8 am), day of the week (i.e., day 1) and channels (i.e., channels 1-4). In this example, a user has shown interest in four channels historically between the hours of 7-9 am. A "1" in the channels columns indicates that based on the user's logged viewing history, the user has viewed that channel for at least a threshold time duration, for example 15 minutes. A "0" in the channels columns indicates that based on the user's logged viewing history, the user did not view that particular channel for the required threshold time duration.

Figure 8:
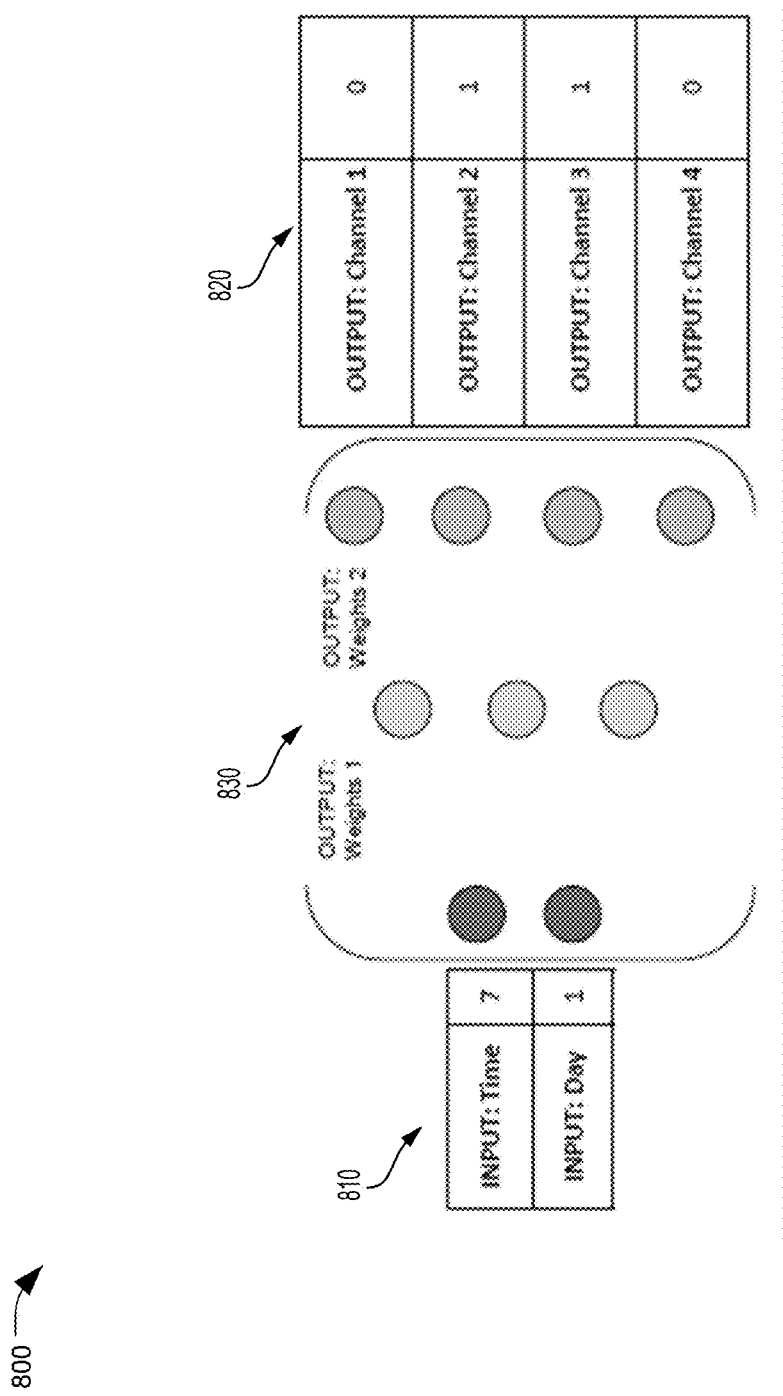
FIG. 8 shows an example neural network model applying the training data table of FIG. 7.

FIG. 8 shows an example neural network model 800 applying the training data table of FIG. 7. As depicted, the neural network model 800 includes a two-unit input layer 810, which includes the variables time and day, a four-unit output layer 820, which includes the four channels, and a three-unit neural network model hidden layer 830. Before data is fed into the neural network model, one or more pre-processing stages may occur. For example, the historical time duration for every channel watched in a particular hour can be extracted. Additionally, any channel whose viewing time duration is lower than the designated threshold is filtered out.

The input layer 810 data is then fed into the neural network model 800, and its features include the current time rounded off to the lowest hour, for example, time=7 am, time=8 am, etc., and the day of the week, for example, Monday=Day 1, Tuesday=Day 2, etc. The output layer 820 data is also fed into the neural network model, and its features include the number of subscribed channels, as well as the probability of a channel being viewed at a particular time, for example, 7-8 am or 8-9 am, etc.

The hidden layer 830 provides an extra computation layer in the neural network model 800. In some implementations, this layer is termed hidden because an operating user does not need to know about the specific functionality of the layer in order to utilize the neural network model 800. Typically, neural network models utilize a single hidden layer 830, and the number of units in the hidden layer 830 are equal to: (number of units in output layer+number of units in input layer)/2. A person having ordinary skill in the art will readily recognize that the number of units in a hidden layer may vary from the equation described above, based in part on the complexity of model.

In operation, a smart TV, such as smart TV 110, 210 and 410 described in FIGS. 1, 2 and 4, can provide the inputs as defined in the input layer 810 to run this example neural network model 800. Based on the inputs and the weights, the neural network model 800 will calculate the values in the output layer 820 as the probability for the user watching a particular channel on a specific time and day. The smart TV may present the channels that exceed a certain probability threshold to the user in a favorite channel list.

The weights for the neural network model 800, such as weight 1 and weight 2, can be trained using one or more algorithms, with one such example being a backpropagation algorithm. The weights, such as weight 1 representing a 3×3 matrix, and weight 2 representing a 4×4 matrix, may be randomly initialized, before the backpropagation algorithm begins an iterative process to correct the weights until an error is minimized.

An example iterative backpropagation algorithm process can include example equations as follows:

Input_Layer=[Time,Day]    Equation (1)

Output_for_Hidden_Layer=activation_function([1, Input_Layer]*weights_1), where "1"added to the Input_Layer can be implemented as the bias term. Or in other words, the "1" in [1,Input_Layer] is the bias term.    Equation (3)

Output_for_Output_Layer=activation_function([1, Output_for_hidden_layer]*weights_2)    Equation (3)

Error=Output_for_Output_Layer−Actual Output    Equation (4)

While training, the motive is to minimize Equation (4) by changing the weights iteratively. The weights may be representative of the minimum error across all training data. The activation function is this example is a sigmoid function, however, other functions like Rectified Linear Unit (ReLU) and hyperbolic tangent function (tanh) also can be used.

After applying the example algorithm described above, the final weights:

TABLE 1

Weight 1 (3 × 3 matrix)

| | | |
|---|---|---|
| −8.0183 | 1.084814 | −0.08984 |
| −9.496 | 1.303474 | −0.10591 |
| −7.37099 | 1.014308 | −0.07249 |

TABLE 2

Weight 2 (4 × 4 matrix)

| | | | |
|---|---|---|---|
| −1.19286 | 0.345207 | 0.388504 | 0.316487 |
| 2.344857 | −1.03469 | −1.19042 | −0.95524 |
| 0.182997 | −0.11605 | −0.1285 | −0.10354 |
| −1.0106 | 1.040616 | 1.199431 | 0.949738 |

In this example, the weight data for weight 1 and weight 2 was obtained by keeping the number of maximum iterations to 50 on an inbuilt optimizer "fmincg" by GNU Octave. Additionally, no further optimization algorithms like regularization or hyperparameter tuning were applied. Finally, a person having ordinary skill in the art will readily recognize that the neural network model 800 framework, as well as the weights and matrices are provided simply as examples, and that other frameworks, weights and matrix constructions can be considered, depending on the user inputs, as well as other design constraints.

Figure 9:
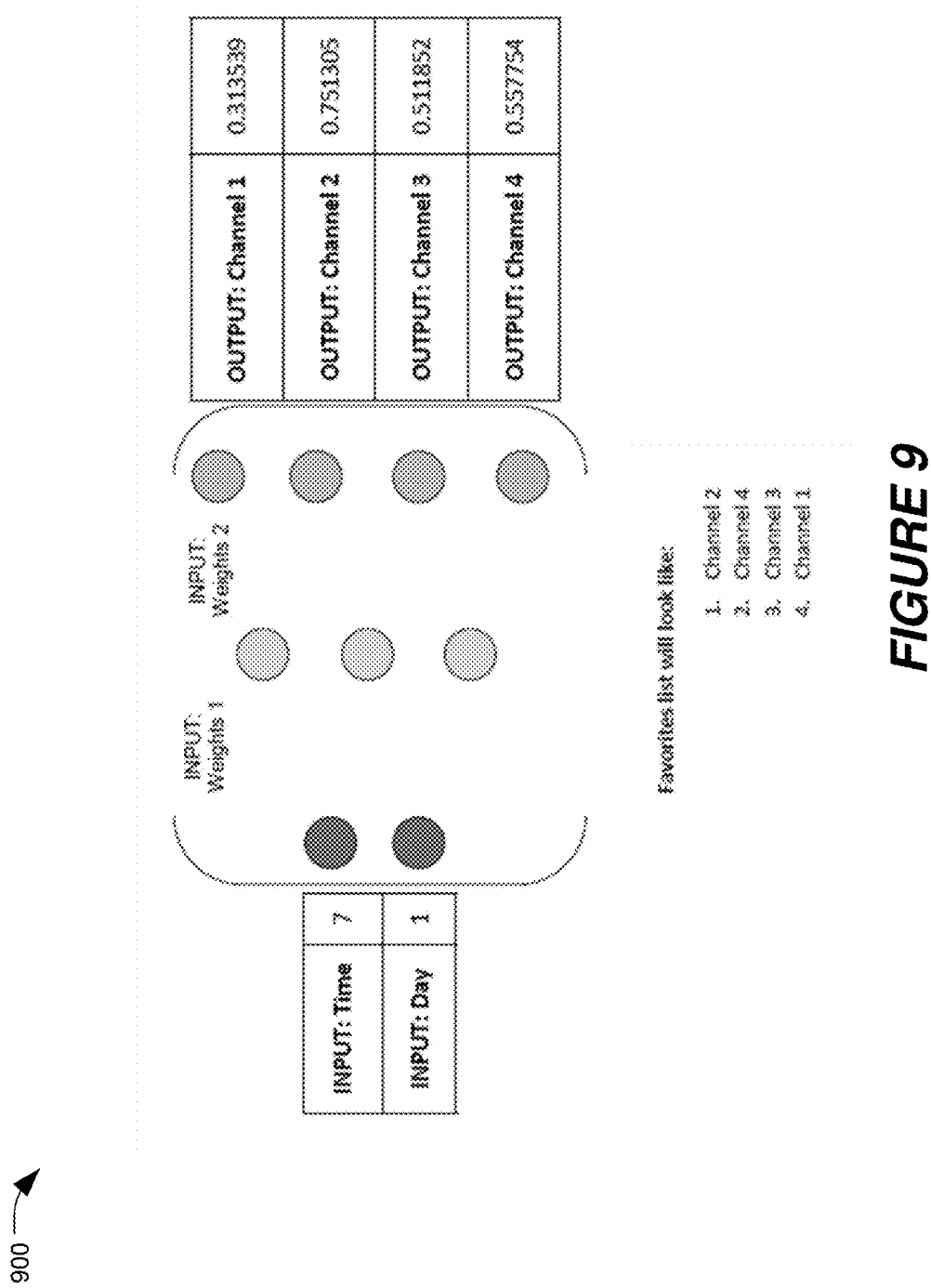
FIG. 9 shows an example neural network model outputting the probabilities of a user viewing a channel at 7 am based on the training data table of FIG. 7 and the Equations described in FIG. 8

FIG. 9 shows an example neural network model 900 outputting the probabilities of a user viewing a channel at 7 am based on the training data table of FIG. 7 and the Equations described in FIG. 8. Based on the training data table of FIG. 7 and the Equations described in FIG. 8, after testing, the neural network model 900 output the probabilities of viewing. In particular, the neural network model 900 output the probabilities of the user watching one of channels 1-4 at 7 am on a Monday. The determined probability of channel 1 is 0.313539, channel 2 is 0.751305, channel 3 is 0.511852, and channel 4 is 0.557754. As such, based on the historical times and historical dates that the user watched TV, the neural network model has determined that channel 2 has the highest probability of being viewed at 7 am on a Monday.

The smart TV, such as smart TV 110, 210 and 410 described in FIGS. 1, 2 and 4, can be implemented to receive the output probabilities and to present the channels 1-4 to the user in a favorite channel list based on the probabilities. In this depicted example, the favorite channel list will be displayed, or otherwise presented to the user in the following order: channel 2, channel 4, channel 3 and channel 1. The favorite channel list can be stored in memory at the smart TV, or in a software application associated with the smart TV, and may include the media programming title, media programming episode, character or plot information, or other such information that allows the user to quickly select the desired channel. In some implementations, the favorite channel list can exceed four channels, or be less than four channels depending on the number of channels subscribed to and viewed by the user.

Figure 10:
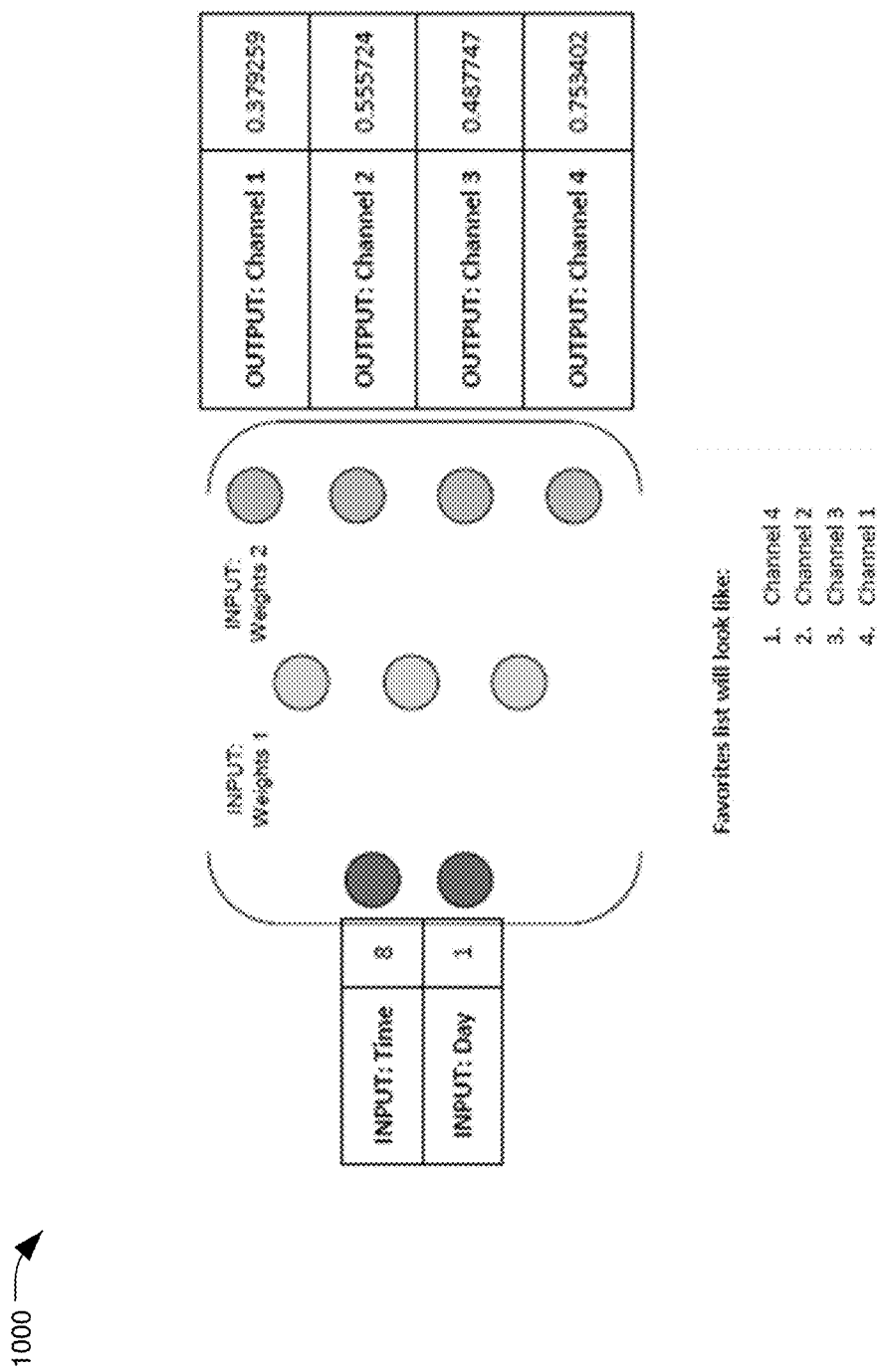
FIG. 10 shows an example neural network model outputting the probabilities of a user viewing a channel at 8 am based on the training data table of FIG. 7 and the Equations described in FIG. 8.

FIG. 10 shows an example neural network model 1000 outputting the probabilities of a user viewing a channel at 8 am based on the training data table of FIG. 7 and the Equations described in FIG. 8. Based on the training data table of FIG. 7 and the Equations described in FIG. 8, after testing, the neural network model 1000 output the probabilities of viewing. In particular, the neural network model 1000 output the probabilities of the user watching one of channels 1-4 at 8 am on a Monday. The determined probability of channel 1 is 0.379259, channel 2 is 0.555724, channel 3 is 0.487747, and channel 4 is 0.753402. As such, based on the historical times and historical dates that the user watched TV, the neural network model has determined that channel 4 has the highest probability of being viewed at 8 am on a Monday.

The smart TV, such as smart TV 110, 210 and 410 described in FIGS. 1, 2 and 4, can be implemented to receive the output probabilities and to present the channels 1-4 to the user in a favorite channel list based on the probabilities. In this depicted example, the favorite channel list will be displayed, or otherwise presented to the user in the following order: channel 4, channel 2, channel 3 and channel 1. Again, the favorite channel list can be stored in memory at the smart TV, or in a software application associated with the smart TV, and may include the media programming title, media programming episode, character or plot information, or other such information that allows the user to quickly select the desired channel.

Figure 11:
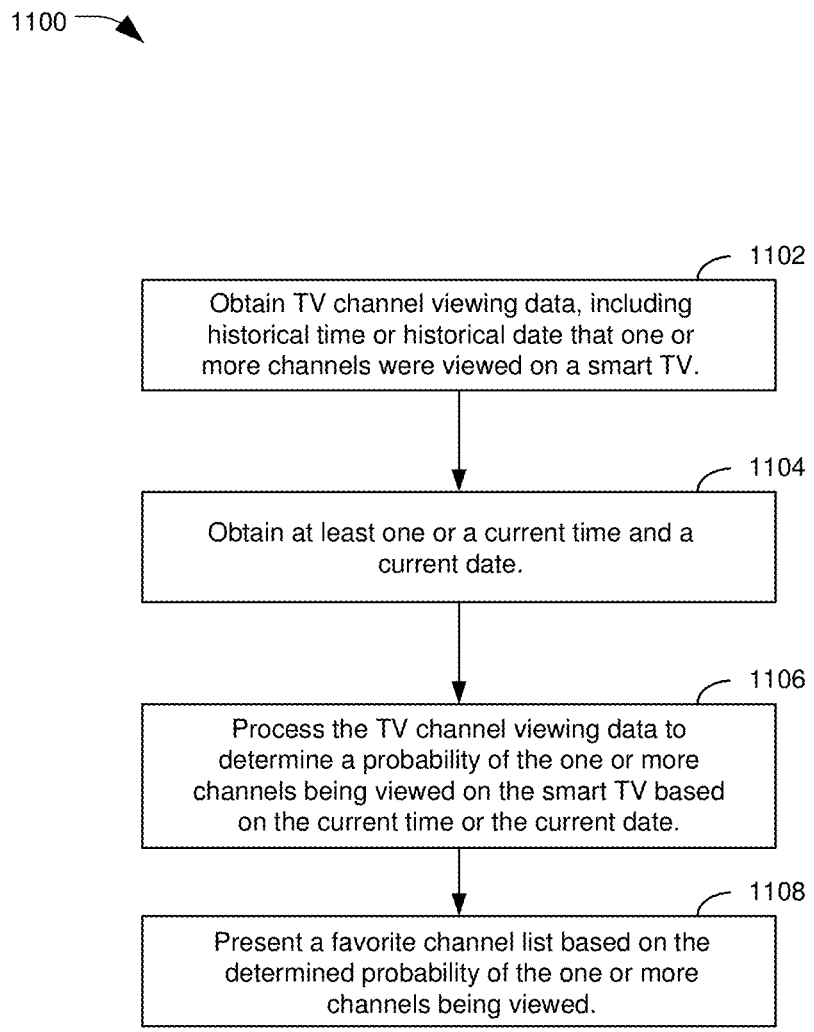
FIG. 11 shows an example method for presenting media programming on an electronic device.

FIG. 11 shows an example method 1100 for presenting media programming on an electronic device. The operations of the method 1100 may be implemented by any suitable electronic device, including the smart TV 110, 210 and 410 depicted and described in FIGS. 1, 2 and 4, or its components as described throughout. Additionally, or alternatively, the operations of the method 1100 also may be implemented by one or more of the smartphone 120, 220 and 420, the tablet device 130, 230 and 430, or the IoT device 140, 240 and 440 (collectively, "the connected devices"), depicted and described in FIGS. 1, 2 and 4, or components of these connected devices as described throughout.

In some implementations, the described smart TV 110, 210 and 410, or any of the connected devices, may execute a set of codes to control the functional elements of the respective device, or of one or more other devices, to perform the functions described in FIG. 11. Additionally, or alternatively, the described smart TVs 110, 210 and 410, or any of the connected devices, may perform aspects of the functions described in FIG. 11 using special-purpose hardware. In some implementations, the described smart TVs 110, 210 and 410, can be paired with one or more of the connected devices.

At block 1102, TV channel viewing data can be obtained. The TV channel viewing data may be obtained by the smart TV 110, 210 and 410. For example, the smart TV 110, 210 and 410 may retrieve the TV channel viewing data from memory, the cloud or other storage, or may receive the TV channel viewing data from a software application or another electronic device. In some implementations, the TV channel viewing data may be obtained by another one of the connected devices. The TV channel viewing data can include historical data related to when one or more channels or media programming was viewed, or displayed, on the smart TV or on any one of the connected devices. The historical data can include one or more of a historical time that a channel or media programming was viewed, a historical date that a channel or media programming was viewed, a historical day of the week that a channel or media programming was viewed, a historical month or year that a channel or media programming was viewed, etc. For example, the TV channel viewing data may include historical data such as channel 1 was viewed at 1:32 pm for 25 minutes on Friday, Jun. 15, 2018 on the smart TV. In another example, the TV channel viewing data may include historical data such as channel 2 was viewed at 2 pm for 35 minutes on Friday, Jun. 15, 2018 on the smart TV. In yet another example, the TV channel viewing data may include historical data such as media programming SportsCenter was viewed at 10 am for 50 minutes on Saturday, Jun. 16, 2018 on the smart TV.

In some implementations, that TV channel viewing data can include historical volume data and historical brightness data. In some implementations, the volume or the brightness of the smart TV 110, 210 and 410 can be automatically adjusted based on at least one of the historical time and the historical date. For example, if the historical volume data indicates that a particular user turns the volume to 15% of the maximum smart TV volume at 11 pm, the smart TV 110, 210 and 410 can be implemented to automatically adjust the volume to 15% of the maximum volume starting at 11 pm. Similarly, if the historical brightness data indicates that a particular user increases the smart TV's brightness while watching sporting events, the smart TV 110, 210 and 410 can be implemented to automatically increase the brightness when sporting event media programming is being viewed.

In some implementations, the TV channel viewing data can be associated with a user profile. The user profile can include information related to the user, in addition to TV channel viewing data. For example, the user profile may indicate that an elderly adult user prefers the smart TV volume to be around 50% of the maximum smart TV volume, and the brightness settings to be around 60% of the maximum smart TV brightness. In some implementations, such as those described in FIGS. 2-6, upon detecting the presence of a user, the smart TV, or other electronic device, can access user profile data associated with a user, and based on that user profile data, can adjust the volume or brightness of the smart TV, or other electronic device. In some implementations, if a minor child is detected, the smart TV, or other electronic device, can access the minor child's user profile, and based on that user profile data, can restrict access to one or more channels or media programming on the smart TV, or other electronic device.

The example training table data 700 depicted in FIG. 7 can include the TV channel viewing data. In other words, one or more users' logged viewing history, which can be organized in the training table data 700, can include the TV channel viewing data.

At block 1104, one or more of a current time and a current date can be obtained. The current time or the current date, or both, can be obtained by the smart TV 110, 210 and 410. For example, the smart TV 110, 210 and 410 may retrieve the current time and current date from memory, the cloud or other storage, or may receive the current time and current date from a software application, media programming application, or another electronic device. In some implementations, the current time and current date may be obtained by another one of the connected devices.

At block 1106, the TV channel viewing data can be processed. The TV channel viewing data can be processed by one or more components of the smart TV 110, 210 and 410, the smart TV 110, 210 and 410 itself, or by one of the connected devices. In some implementations, the neural network model 800 depicted in FIG. 8 can be employed to process the TV channel viewing data. Processing the TV channel viewing data can include determining a probability that one or more channels or media programming is likely to be viewed on the smart TV based on at least one of the current time and the current date. For example, the neural network model 800 can be implemented to analyze a user's historical TV channel viewing data and to determine the probability of which channels or media programming the user is likely to watch at the present time, or at a future time.

In some implementations, employing the neural network model can include, analyzing the user's logged viewing history for each of the historical times and historical dates, and determining a duration that each of one or more channels, or media programming, was viewed on the smart TV. The determined duration, or determined time duration, can be compared to a threshold time duration. The threshold time duration can be set by the neural network model itself, or can be input by a user. For example, the threshold time duration may be 10 minutes, 15 minutes, 20 minutes, 25 minutes, 30 minutes, 45 minutes, 1 hour, etc. The neural network model can be implemented to filter out, or remove, one or more channels, or media programming, that were viewed on the smart TV below the threshold time duration from its processing pool. For example, assuming the threshold time duration is 30 minutes and turning back to the examples described with respect to block 1102, the TV channel viewing data associated with channel 1 will be filtered out by the neural network model because the duration it was viewed, 25 minutes, is less than the threshold time duration. The TV channel viewing data associated with channel 2 and the media programming SportsCenter will remain in the processing pool for the neural network model, as they were watched for 35 minutes and 50 minutes, respectively, which are greater than the threshold time duration.

At block 1108, a favorite channel list can be presented. The favorite channel list can be presented on the smart TV 110, 210 and 410, or on one of the connected devices. The favorite channel list can include one or more channels that the user is likely to watch at the present time, or at a future time. Alternatively, the favorite channel list can include one or more media programming selections that the user is likely to watch at the present time, or at a future time. The favorite channels list can be based on the determined probability of the one or more channels being viewed. For example, the neural network model 800 can output probabilities of a particular user watching one or more channels, or media programming, at a particular time, which can be received by the smart TV 110, 210 and 410 and presented on the smart TV display interface. In some implementations, the favorite channels list can include the one or more channels in order based on the determined probability. For example, if the neural network model determines that SportsCenter has the highest probability of being viewed at the current time, SportsCenter will be ordered at the top of the favorite channels list.

While the example method 1100 in FIG. 11 includes four discrete blocks, a person having ordinary skill in the art will readily recognize that other blocks can be inserted between the depicted blocks. Additionally, other blocks may be performed before or after certain depicted blocks.

Figure 12:
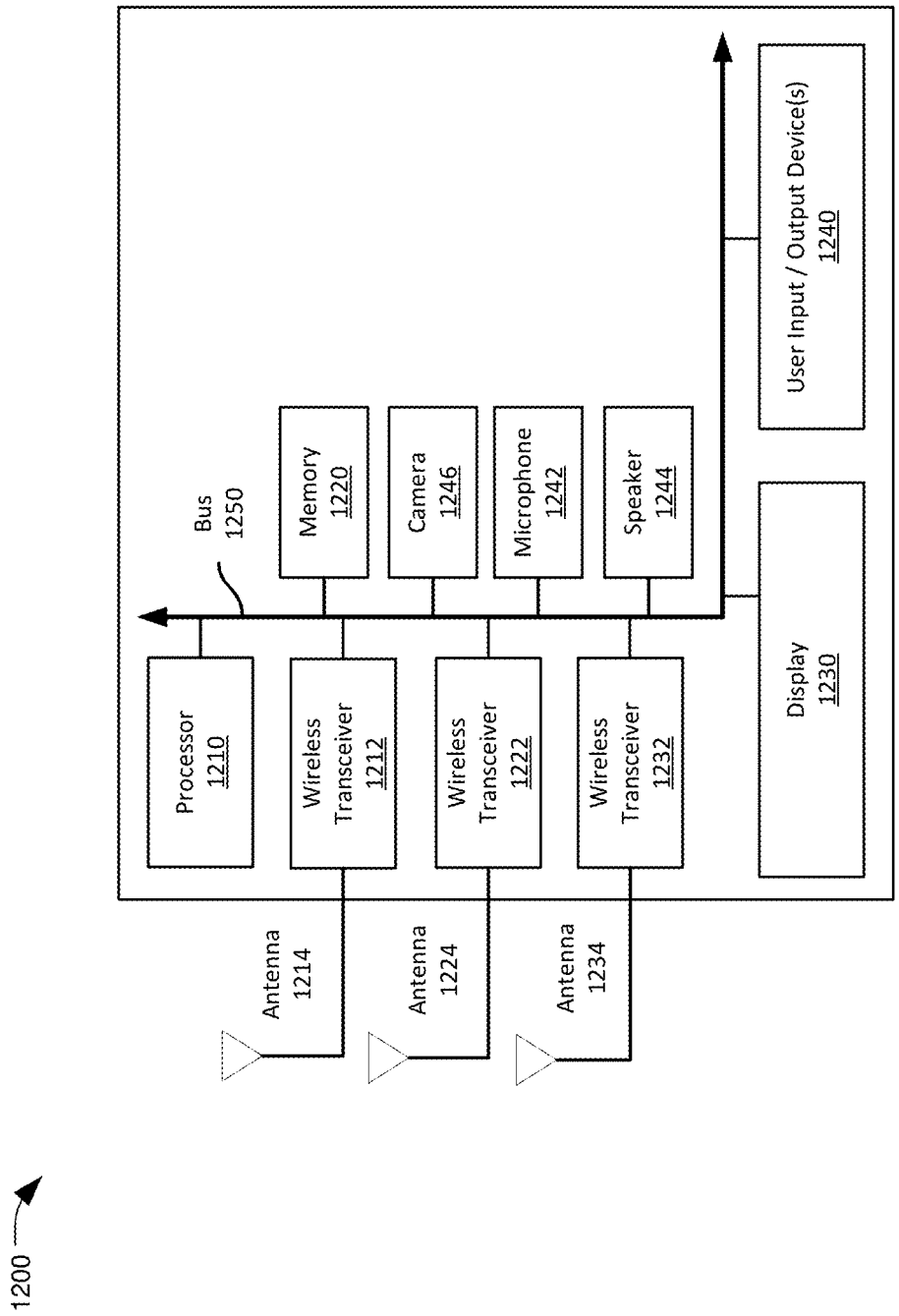
FIG. 12 shows an example electronic device for intelligent routing of notifications related to media programming.

FIG. 12 shows an example electronic device 1200 for intelligent routing of notifications related to media programming. The example electronic device 1200 includes a processor 1210, memory 1220, a display, user input/output devices 1240, a microphone 1242, a speaker 1244, and a camera 1246 in communication with each other via bus 1250. In addition, the electronic device 1200 includes three wireless transceivers 1212, 1222, 1232 and associated antennas 1214, 1224, 1234. The processor 1210 is configured to execute processor-executable program code stored in the memory 1220 to execute one or more methods for intelligent routing of notification of incoming voice communication requests according to this disclosure.

In this example, the electronic device 1200 is a smart TV, such as the smart TVs 110, 210 and 410 depicted in FIGS. 1, 2 and 4. However, the electronic device 1200 may be any electronic device with communication capabilities, and configured to receive and handle audio, or audio/visual communications over a communications network. Communication between the electronic device 1200 and other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP. Example electronic or computing devices according to this disclosure may be any device described throughout this disclosure, and not limited to the following examples: smartphones, laptop computers, desktop computers, tablets, phablets, satellite phones, cellular phones, dedicated video conferencing equipment, IOT hubs, virtual assistant devices, wearable devices, in-vehicle entertainment or communication systems, home security systems, or any device having an interface to a communications network and suitable input and output devices.

In this example, the electronic device 1200 is equipped with a wireless transceiver 1212 and antenna 1214 configured to communicate with a cellular network using any suitable communications technology as discussed above. In addition to the wireless transceiver 1212 and antenna 1214, the electronic device 1200 also includes additional wireless transceivers 1222, 1232 and antennas 1224, 1234 configured for, as an example, Bluetooth communications and Wi-Fi communications, respectively. Thus, the electronic device 1200 is able to connect to one or more cellular devices, Bluetooth devices, as well as Wi-Fi devices, including Wi-Fi APs.

The electronic device 1200 also includes a display 1230 and user input/output devices 1240. Suitable user input devices include remote controls, touch-sensitive surfaces, such as touch screens, buttons, knobs, rocker switches, directional pads, mice, keyboards, microphones, etc. Suitable output devices include speakers, display devices, braille output devices, haptic output devices, etc.

Figure 13:
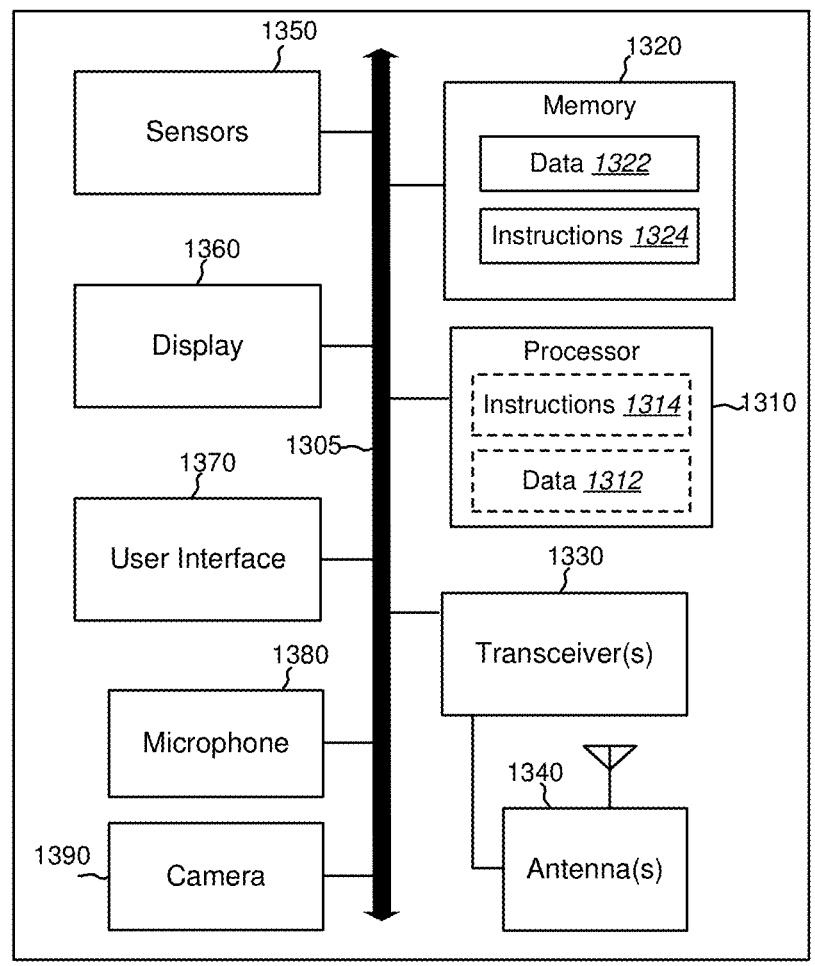
FIG. 13 shows an example electronic device that may be connected to the electronic device shown in FIG. 12.

FIG. 13 shows an example electronic device 1300 that may be connected to the electronic device 1200 shown in FIG. 12. The electronic device 1300 may include a wide variety of electronic devices, including any of those discussed above, such as and not limited to the smart TV 110, 210 and 410, the smartphone 120, 220 and 420, the tablet device 130, 230 and 430, or the IoT device 140, 240 and 440 depicted in FIGS. 1, 2 and 4, respectively. The electronic device 1300 can include a processor 1310, a memory 1320, at least one transceiver 1330 (i.e., a transmitter and a receiver), and at least one antenna 1340. The electronic device 1300 also can include one or more sensors 1350, a display 1360, a user interface (UI) 1370 (such as a keypad, touchscreen, voice or gesture interface), a microphone 1380 (representative of a microphone and a speaker) and a camera 1390. Although not depicted, the electronic device 1300 can include one or more network interfaces, such as a wireless network interface (like a cellular interface, a WLAN interface, a Bluetooth® interface, a WiMAX interface, a ZigBee® interface, a Wireless USB interface, etc.) or a wired network interface (like as a powerline communication interface, an Ethernet interface, etc.). In some implementations, the electronic device 1300 may support multiple network interfaces, each of which may be configured to couple the electronic device 1300 to a different communication network. Each of the components (or "modules") described with reference to FIG. 13 can communicate with one another, directly or indirectly, over at least one bus 1305. The bus 1305 may include a power bus, a control signal bus, a status signal bus, a data bus, etc. Example buses 1305 can include PCI, ISA, PCI-Express, HyperTransport®, InfiniBand®, NuBus, AHB, AXI, etc.

The processor 1310 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 1310 may be referred to as a central processing unit (CPU). Although just a single processor 1310 is depicted in the electronic device 1300 of FIG. 13, in alternative implementations, a combination of processors (such as an ARM and DSP) including multiple processors, multiple cores, multiple nodes, or implementing multi-threading, etc., can be used.

The electronic device 1300 also includes memory 1320 in electronic communication with the processor 1310 (i.e., the processor can read information from and write information to the memory 1320). Memory 1320 can be deemed to be in electronic communication with the processor 1310 if the processor 1310 can read information from or write information to the memory 1320. The memory 1320 may be any electronic component capable of storing electronic information. The memory 1320 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 1322 and instructions 1324 may be stored in the memory 1320. The instructions may include one or more programs, routines, sub-routines, functions, procedures, code, etc. The instructions may include a single computer-readable statement or many computer-readable statements. The instructions 1324 may be executable by the processor 1310 to implement the methods disclosed herein. Executing the instructions 1324 may involve the use of the data 1322 that is stored in the memory 1320. When the processor 1310 executes the instructions 1324, various portions of the instructions 1314 may be loaded onto the processor 1310, and various pieces of data 1312 may be loaded onto the processor 1310.

The memory 1320 also can store processor- or computer-executable software code containing instructions that, when executed, cause the processor 1310 to perform various functions described herein for optical communication, including reception of a signal, and generation and transmission of an appropriate response signal. The processor 1310 also can be implemented to decode received signals and encode response signals.

The processor 1310 processes information received through the transceiver 1330 as well as information to be sent to the transceiver 1330 for transmission through the antenna 1340. Additionally, the processor 1310 can process information received through one or more sensors 1350 as well as information to be presented by the display 1360.

In some implementations, the transceiver 1330 can be implemented as both a transmitter and a receiver, and can modulate data and provide the modulated data to the antenna 1340 for transmission, as well as to demodulate data received from the antenna 1340. In some such implementations, the transceiver 1330 can be implemented as at least one RF transmitter and at least one separate RF receiver. The transceiver 1330 may communicate bi-directionally, via one or more antennas, wired, or wireless communication links as described above. For example, the transceiver 1330 may represent a wireless transceiver and may communicate bi-directionally with another wireless transceiver, such as a wireless transceiver associated with the electronic device 1200 depicted in FIG. 12. The transceiver 1330 also may include a modem to modulate the packets and provide the modulated packets to the antennas for transmission, and to demodulate packets received from the antennas.

The display 1360 can be implemented from any suitable display technology. For example, the display 1360 can be implemented from a liquid crystal display (LCD), an e-ink display, a digital microshutter (DMS) display, or an interferometric modulator (IMOD) display. Additionally, the display 1360 can be implemented as a flat-panel display, such as plasma, electroluminescent (EL) displays, organic light emitting diode (OLED) display, super twisted nematic (STN) display, or thin-film transistor (TFT) LCD, or a non-flat-panel display, such as a cathode ray tube (CRT) or other tube device. The microphone 1380 and the camera 1390 allow the electronic device 1300 to be suitable for engaging in voice and video communications. And while the depicted electronic device 1300 includes the microphone 1380 and camera 1390, other example electronic devices may lack a camera 1390, while having a microphone 1380 and speaker functionality, such as the IoT device 140, 240 and 440 depicted in FIGS. 1, 2 and 4.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method, comprising:
receiving, by a smart television (TV), an indication of upcoming media programming, wherein the upcoming media programming is based on a user profile;
identifying one or more devices in communication with the smart TV, each of the one or more devices including at least one of a microphone or a camera;
instructing at least one identified device to detect audio signals using its respective microphone, or to detect visual signals using its respective camera;
selecting at least one device of the one or more devices based on the detected audio signal or detected visual signal; and
providing instructions to the selected device to output a notification related to the upcoming media programming.

2. The method of claim 1, wherein the upcoming media programming is one of a live television program, a recorded television program, a broadcast television program, or an application-provided program.

3. The method of claim 1, wherein selecting the first device based on the detected audio signal includes recognizing a voice.

4. The method of claim 3, further comprising determining a distance to the recognized voice, and wherein selecting the first device is further based on the determined distance.

5. The method of claim 1, wherein selecting the first device based on the detected visual signals includes recognizing a face.

6. The method of claim 5, wherein recognizing the face includes a face recognition technique.

7. The method of claim 1, further comprising presenting, on the smart TV, the upcoming media programming in a favorite channel list.

8. The method of claim 7, further comprising:
obtaining media programming viewing data, wherein the media programming viewing data includes at least one of a historical time and a historical date that one or more media programs were viewed;
obtaining at least one of a current time and a current date;
processing the media programming viewing data to determine a probability of the one or more media programs being viewed based on at least one of the current time and the current date; and
presenting the favorite channel list based on the determined probability of the one or more media programs being viewed.

9. The method of claim 8, wherein processing the media programming viewing data includes employing a neural network model.

10. The method of claim 9, wherein employing the neural network model comprises:
determining a duration that the one or more media programs were viewed for each of the at least one of the historical time and the historical date;
setting a threshold time duration;
comparing the determined duration to the threshold time duration; and
filtering out the one or more media programs viewed below the threshold time duration.

11. A smart television (TV), comprising:
a network interface;
a non-transitory computer-readable medium; and
a processor in communication with the network interface, and the non-transitory computer-readable medium, and capable of executing processor-executable program code stored in the non-transitory computer-readable medium, to cause the smart TV to:

receive an indication of upcoming media programming, wherein the upcoming media programming is based on a user profile;

identify one or more devices in communication with the smart TV, each of the one or more devices including at least one of a microphone or a camera;

instruct at least one identified device to detect audio signals using its respective microphone, or to detect visual signals using its respective camera;

select at least one device of the one or more devices based on the detected audio signal or detected visual signal; and provide instructions to the selected device to output a notification related to the upcoming media programming.

12. The smart TV of claim 11, wherein selecting the first device based on the detected audio signal includes recognizing a voice.

13. The smart TV of claim 12, wherein the processor is further capable of executing processor-executable program code to:

determine a distance to the recognized voice, and wherein selecting the first device is further based on the determined distance.

14. The smart TV of claim 11, wherein selecting the first device based on the detected visual signals includes detecting the presence of a user.

15. The smart TV of claim 14, wherein detecting the presence of the user includes employing one or more of a camera, a microphone, or a fingerprint sensor associated with at least one of the smart TV a mobile device, a smartphone, a laptop computer, a tablet device, a wearable device, an Internet of Things (IoT) device, an Internet of Everything (IoE) device, an IoT hub, or an IoE hub.

16. A smart television (TV), comprising:

means for receiving an indication of upcoming media programming, wherein the upcoming media programming is based on a user profile;

means for identifying one or more devices in communication with the smart TV, each of the one or more devices including at least one of a microphone or a camera;

means for instructing at least one identified device to detect audio signals using its respective microphone, or to detect visual signals using its respective camera;

means for selecting at least one device of the one or more devices based on the detected audio signal or detected visual signal; and means for providing instructions to the selected device to output a notification related to the upcoming media programming.

17. The smart TV of claim 16, wherein the one or more devices includes at least one of a mobile device, a smartphone, a laptop computer, a tablet device, a wearable device, an Internet of Things (IoT) device, an Internet of Everything (IoE) device, an IoT hub, an IoE hub, or another smart TV.

18. The smart TV of claim 16, wherein the upcoming media programming is one of a live television program, a recorded television program, a broadcast television program, or an application-provided program.

19. The smart TV of claim 16, wherein the notification includes at least one of a push message, a SMS message, a Way2SMS message, an audio alert, an audio message, or an email message.

20. The smart TV of claim 16, further comprising presenting the upcoming media programming in a favorite channel list.

21. The smart TV of claim 20, further comprising:

means for obtaining media programming viewing data, wherein the media programming viewing data includes at least one of a historical time and a historical date that one or more media programs were viewed on the smart TV;

means for obtaining at least one of a current time and a current date;

means for processing the media programming viewing data to determine a probability of the one or more media programs being viewed on the smart TV based on at least one of the current time and the current date; and means for presenting the favorite channel list based on the determined probability of the one or more media programs being viewed.

22. The smart TV of claim 21, wherein the means for processing the media programming viewing data includes employing a neural network model.

23. The smart TV of claim 22, wherein employing the neural network model comprises:

determining a duration that the one or more media programs were viewed on the smart TV for each of the at least one of the historical time and the historical date;

setting a threshold time duration;

comparing the determined duration to the threshold time duration; and filtering out the one or more media programs viewed below the threshold time duration.

24. The smart TV of claim 21, further comprising:

means for adjusting at least one of a volume or a brightness of the smart TV, wherein the adjusting is based on at least one of the historical time and the historical date.

25. The smart TV of claim 21, further comprising means for restricting access to one or more media programs.

26. A non-transitory computer-readable medium comprising processor-executable program code configured to cause a processor of a smart television (TV) to:

receive an indication of upcoming media programming, wherein the upcoming media programming is based on a user profile;

identify one or more devices in communication with the smart TV, each of the one or more devices including at least one of a microphone or a camera;

instruct at least one identified device to detect audio signals using its respective microphone, or to detect visual signals using its respective camera;

select at least one device of the one or more devices based on the detected audio signal or detected visual signal; and provide instructions to the selected device to output a notification related to the upcoming media programming.

27. The non-transitory computer-readable medium of claim 26, wherein selecting the first device based on the detected audio signal includes recognizing a voice.

28. The non-transitory computer-readable medium of claim 27, wherein the processor is further capable of executing processor-executable program code to:

determine a distance to the recognized voice, and wherein selecting the first device is further based on the determined distance.

29. The non-transitory computer-readable medium of claim 26, wherein selecting the first device based on the detected visual signals includes recognizing a face.

30. The non-transitory computer-readable medium of claim 29, wherein recognizing the face includes a face recognition technique.

* * * * *